(12) United States Patent
Jang et al.

(10) Patent No.: US 7,523,958 B2
(45) Date of Patent: Apr. 28, 2009

(54) BRACKET FOR SECURING SIDE AIRBAG FOR AUTOMOTIVE VEHICLE

(75) Inventors: Myung-ryun Jang, Suwon-si (KR); Byoung-sun Yoo, Seoul (KR); Tae-woo Kim, Wonju-si (KR); Dong-jun Lee, Wonju-si (KR); Eun-hwan Oh, Wonju-si (KR); Kyun-soon Choi, Jeonju-si (KR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/717,423

(22) Filed: Mar. 13, 2007

(65) Prior Publication Data

US 2007/0241539 A1 Oct. 18, 2007

(30) Foreign Application Priority Data

| Mar. 14, 2006 | (KR) | ................... 20-2006-0006828 U |
| Mar. 17, 2006 | (KR) | ................... 20-2006-0007230 U |
| Mar. 27, 2006 | (KR) | ................... 20-2006-0008135 U |
| Apr. 18, 2006 | (KR) | ................... 20-2006-0010369 U |
| Apr. 20, 2006 | (KR) | ................... 20-2006-0010629 U |

(51) Int. Cl.
*B60R 21/213* (2006.01)

(52) U.S. Cl. ..................................... 280/730.2; 24/289

(58) Field of Classification Search .............. 280/728.2, 280/730.2, 749; 24/289, 291, 292, 297
See application file for complete search history.

(56) References Cited

U.S. PATENT DOCUMENTS

| 2,051,142 | A | * | 8/1936 | Hovey ............................. 2/48 |
| 5,583,733 | A | * | 12/1996 | Cronin ....................... 361/111 |
| 5,951,046 | A | * | 9/1999 | Hosoda et al. ............ 280/801.2 |
| 7,320,477 | B2 | * | 1/2008 | Kawabe et al. ........... 280/730.2 |
| 2001/0040360 | A1 | | 11/2001 | Ishiyama et al. ......... 280/728.2 |
| 2003/0006591 | A1 | | 1/2003 | Yashuara et al. ......... 280/730.2 |
| 2003/0042712 | A1 | * | 3/2003 | Henderson et al. ....... 280/728.2 |
| 2003/0222435 | A1 | * | 12/2003 | Schmidt et al. .......... 280/728.2 |
| 2005/0029778 | A1 | * | 2/2005 | Weber et al. ............. 280/728.2 |
| 2006/0192368 | A1 | * | 8/2006 | Hall et al. ................ 280/730.2 |

* cited by examiner

*Primary Examiner*—John Q. Nguyen
*Assistant Examiner*—Joseph Rocca
(74) *Attorney, Agent, or Firm*—Douglas D. Fekete

(57) ABSTRACT

There is provided a bracket for securing a side airbag for an automotive vehicle. The bracket fixes a path such that a connection strap connecting the side airbag to the bracket is secured to an A-pillar and removes any interference when the side airbag is assembled, to make it easy to assemble the side airbag in a manufacturing site. The bracket has a through aperture through which a bolt is fastened, and a mounting plate secures the side airbag to the vehicle. Protrusions are each formed on each of both side ends of the bracket, and a bracket clip is installed on the external surface of the bracket. The bracket clip comprises: a bending part formed in the middle of the bracket clip; a plurality of support plates formed at either side of the bending part; and through apertures formed on the support plates, corresponding to the through aperture of the bracket. In the present invention, the path of the connection strap connecting the side airbag to the bracket is fixed by the bracket, and there is no interference when the bracket is assembled to install the side airbag in the A-pillar. Therefore, the assembling efficiency is improved, time is save, and productivity is improved in the manufacturing site.

4 Claims, 23 Drawing Sheets

FIGURE 2A
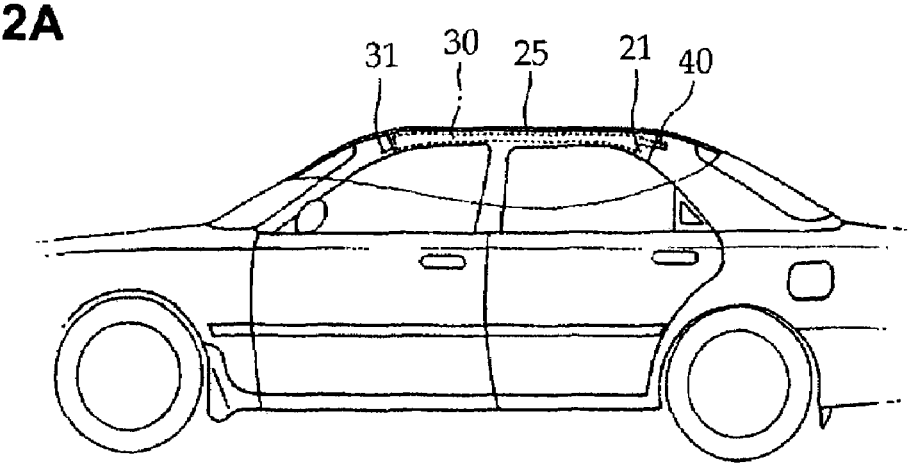
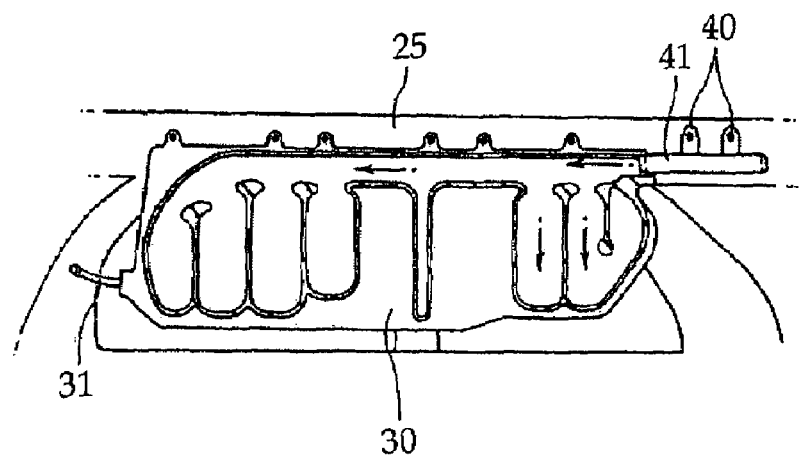
FIGURE 2B

BRACKET FOR SECURING SIDE AIRBAG FOR AUTOMOTIVE VEHICLE

CROSS-REFERENCE TO RELATED APPLICATION

This application claims the benefit of Korean Utility Model Application No. 2006-0006828, filed on Mar. 14, 2006, No. 2006-0007230, filed on Mar. 17, 2006, No. 2006-0008135, filed on Mar. 27, No. 2006-010369, filed on Apr. 18 and No. 2006-010629, filed on Apr. 20, the disclosure of which is hereby incorporated herein by reference in its entirety.

BACKGROUND OF THE INVENTION

1. Technical Field

The present invention relates to a bracket for securing a side airbag for an automotive vehicle and, more particularly, to a bracket for securing a side airbag for an automotive vehicle, which easily secures the side airbag and is prevented from being broken or deformed when it is fastened by a bolt.

2. Discussion of Related Art

In addition to a safety belt, generally, an airbag module installed in an automotive vehicle is a device for maximally protecting an occupant against injury when the automotive vehicle crashes.

An airbag module is typically installed in or around a steering wheel of a driver seat and in an instrument panel of a passenger seat. When an automotive vehicle crashes, the airbag module is operatively connected to a safety belt by a crash sensing sensor and an electronic control unit (hereinafter, referred to as "ECU"), and it maximally protects an occupant against injury.

That is, when an automotive vehicle crashes, the crash sensing sensor outputs a crash sensing signal to the ECU. The ECU determines whether to operate an airbag, depending on the intensity of the crash. If the airbag needs to be operated, the ECU operates an inflator to inflate the airbag.

In recent years, an airbag module has been installed at a side in an automotive vehicle, to protect an occupant upon a side impact crash.

The airbag module installed at the side of an automotive vehicle is generally called a 'side airbag.'

The side airbag is installed in an A-pillar which is connected from the front passenger seat to the back seat. When side impact is applied, the side airbag is inflated by the operation of the inflator.

In this application, a side airbag is used for an automotive vehicle, which prevents excessive inflation pressure from being applied to a lower end part of the side airbag to be deployed when the vehicle encounters a side crash, and balances the inflation pressure by an injected gas in a thorax bag and a head bag to reduce shaking when the side airbag is inflated and improves the work efficiency upon manufacture.

The constitution of a side airbag will be described, in brief, with reference to FIG. 1A. The side airbag comprises: a thorax bag 12 and a head bag 11 to be deployed upon a side crash. The thorax bag 12 comprises a mounting part 14 and a lower end part 16. The mounting part 14 has a neck shape at a rear side of the thorax bag 12. The lower end part 16 is formed at a distance from the mounting part 14.

An upper part and a lower part of the side airbag are formed symmetrically, based on the center of the mounting part 14. A tether 13 is positioned between the thorax bag 12 and the head bag 11. A vent aperture is formed in the side airbag at a distance from the mounting part 14. A pulling plate 15 is symmetrical with the thorax bag 12, and the thorax bag 12 is extended from the head bag 11.

The aforementioned side airbag is installed by fastening a bolt to the A-pillar of the automotive vehicle. To install the side airbag onto the A-pillar, additional securing devices are needed.

That is, a number of brackets, each having a securing aperture into which a bolt is inserted, are positioned at predetermined positions of the side airbag and are secured by fastening bolts.

An example of a conventional securing device of the aforementioned side airbag will be described with reference to FIG. 1B. A bracket 3a with a welding bolt 2a is welded at one side of a back part frame 1a. A back part 7a with a pad 5a covered by a cover 6a is positioned at one side of an installation space 4a of the side airbag.

The end of the cover 6a is inserted into the airbag installation space 4a. Therefore, one side of each of the airbag housing 8a and the airbag door 9a is positioned inside a support wire 10a, and the other side of each of the airbag housing 8a and the airbag door 9a is fixed to the welding bolt 2a of the bracket 3a.

However, since the conventional bracket for securing the side airbag is usually made of plastics, the bracket is broken or deformed while the bolt is fastened and therefore, the bracket cannot perform its function. Moreover, since this problem makes it impossible for the side airbag to be normally operated, an occupant is fatally injured.

Another conventional side airbag 30 comprises: an airbag which is installed inside a headlining of a roof side panel; an inflator which is installed at one side of the airbag and which has a gas generating material to deploy the airbag upon a side crash; and a guide member with one side end which is connected to the airbag and the other side end which is positioned to pivot around the roof side panel.

The constitution of the aforementioned side airbag 30 will be described, in detail, with reference to FIGS. 2A and 2B.

As described in FIG. 2, a headlining 21 is composed of plastics which are attached to the ceiling inside an automotive vehicle. Basic materials of the headlining 21 are the surface and pad with the functions, such as insulation from the roof, insulation of sound, or absorption of sound inside the vehicle and the like. The headlining 21 is formed integrally with these surface and pad.

As a device to perform an operation of deploying the side airbag 30, an inflator 40 rapidly burns a gas generating material including an element of sodium nitrite, and the like, by using an igniter and simultaneously generates nitrogen gas. The inflator 40 is secured to a roof side panel 25 by a separate bracket 41.

A strap 31 (hereinafter, referred to as "connection strap") is positioned at the other side of the inflator 40. The strap 31 prevents one side of the side airbag 30 from waving when the airbag 30 is deployed by the inflator. This is illustrated in FIG. 2B.

However, since the conventional side airbag has no specific structure to hold the connection strap, it is troublesome to assemble the side airbag in the A-pillar due to the interference between the A-pillar and the connection strap.

That is, an operator in a manufacturing site needs to check whether there is the interference with the connection strap when assembling the side airbag in the A-pillar. When the interference occurs, a process of avoiding the interference is added. As a result, a working time becomes longer and the assembling efficiency is deteriorated.

Further, as illustrated in FIG. 3A, a conventional bracket 50 for securing a side airbag has a shape in which a connection strap 52 is connected to a simply long rectangular aperture 51. Therefore, the bracket 50 is not properly connected to the connection strap 52.

That is, since the connection strap 52 is movable in the bracket 50, the connection strap 52 turns within the rectangular aperture 51 of the bracket 50, as illustrated in FIG. 3B.

Therefore, when the side airbag is mounted in an automotive vehicle, there are added a process of checking whether a state of the bracket is good or bad and, if the connection strap 52 turns, a process of returning the connection strap 52 to its original position. Consequently, the work becomes troublesome.

Moreover, the bracket 50 is pulled towards the side airbag due to momentary gas explosive power which is generated while the side airbag is operated upon an accident. In this case, the connection strap 52 inclines towards a lower part of the rectangular aperture 51 as illustrated in FIG. 3C. Consequently, the side airbag is not stably secured.

Moreover, when a connection strap 52 is cut by the friction caused during the accident, the side airbag is not inflated in a normal direction, upon the side crash.

Another conventional side airbag 60 will be described with reference to FIGS. 4A and 4B.

As illustrated in FIGS. 4A and 4B, the side airbag 60 comprises: a side airbag cushion 61, an inflator 62 supplying a gas to the side airbag cushion 61, a housing receiving the inflator 62, and a diffuser 64 included in the side airbag 60 and supplying a gas, which is generated from the inflator 62, to the side airbag cushion 61.

The inflator 62 is electrically connected to a control unit (not shown). The control unit is connected to a crash sensing sensor (not shown) in an automotive vehicle.

The side airbag cushion 61 is formed, at predetermined width and length, to sufficiently protect a head part of an occupant of the automotive vehicle. A tether 65 is provided in one part of an end of the side airbag cushion 61. The tether 65 guides the side airbag 60 to be broadly inflated lengthwise or widthwise when the side airbag 60 is deployed.

The diffuser 64 has a tube shape. A number of apertures (not shown) are formed, to be positioned lengthwise, on an outer circumference surface of the diffuser 64. While the diffuser 64 is received inside an upper end part of the side airbag 60, one end of the diffuser 64 is connected to the housing 63 receiving the inflator 62.

When the diffuser 64 and the housing 63 are connected to each other, a holder 66 fastens a part of the side airbag 60 which covers the connection part of the diffuser 64 and the housing 63, to be sealed.

A number of holders 67 are connected to the upper end of the side airbag 60, at a predetermined interval. The holders 67 secure the side airbag cushion 61 to a roof rail. The holders 67 cover an external surface of a side airbag housing 68 and temporarily hold the side airbag housing 68. The side airbag housing 68 covers the side airbag cushion 61 which is folded.

However, in the conventional side airbag 60, the holders 67 securing the side airbag 60 are formed of a single material. When the holders 67 are made of a soft material, an additional component is needed to prevent the holders 67 from being broken when the side airbag 60 is secured to the automotive vehicle by fastening a bolt. When the holders are made of a hard material to prevent the holders from being broken, there is a difficulty in cutting a cutting part when the side airbag 60 is deployed.

Further, in the aforementioned conventional side airbag 60, a space of each holder 67 is narrow and a shape of the holder 67 is gradually narrower downwardly. Therefore, since a region for supporting the side airbag 60 is narrow, many holders 67 are needed. This results in a longer working time in the manufacturing site.

That is, when the conventional side airbag 60 is mounted, since the additional components are needed and a number of holders 67 are installed, the assembling efficiency is lowered and the operability is not consistently provided by the defect of assembly.

SUMMARY OF THE INVENTION

Therefore, the present invention is directed to provide a bracket for securing a side airbag for an automotive vehicle, wherein, when the bracket is fastened by a bolt, the bracket is prevented from being broken or deformed, by protecting the bolt fastened bracket formed on a mounting plate, and wherein the side airbag is maintained in the best condition.

Another object of the present invention is to provide a bracket for securing a side airbag for an automotive vehicle, wherein assembling the side airbag in a manufacturing site is easy, by fixing a path of a connection strap so that the connection strap connecting the side airbag to the bracket is secured against an A-pillar and by removing interference with the connection strap upon the assembling of the side airbag.

Another object of the present invention is to provide a bracket for securing a side airbag for an automotive vehicle, wherein a connection strap is prevented from affecting a deploying performance of the side airbag, by making it easy for the connection strap to be released from a clip.

Another object of the present invention is to provide a bracket for securing a side airbag for an automotive vehicle, wherein an operator easily mounts the side airbag in a manufacturing site by preventing a connection strap from turning in an aperture of the bracket used for securing the side airbag, and wherein a failure in a securing structure is prevented.

Another object of the present invention is to provide a bracket for securing a side airbag for an automotive vehicle, wherein safety of a passenger is improved by normally absorbing side impact applied to the passenger upon an accident, by preventing a connection strip from being inclined towards one side when a bracket of the side airbag is distorted upon a crash, and by enabling a normal operation of the side airbag.

Another object of the present invention is to provide a bracket for securing a side airbag for an automotive vehicle, wherein an airbag cushion is restrained by one component.

Another object of the present invention is to provide a bracket for securing a side airbag for an automotive vehicle, wherein the side airbag is simply assembled to be easily secured and the side airbag is easily dissembled without breakage, so that the efficiency in assembling or dissembling the side airbag is improved.

Another object of the present invention is to provide a bracket for securing a side airbag for an automotive vehicle, wherein the side airbag is stably secured without using any additional components.

Another object of the present invention is to provide a bracket for securing a side airbag for an automotive vehicle, wherein a cut part is easily parted when the side airbag is deployed, so that the airbag cushion is smoothly deployed.

Exemplary embodiments of the present invention provide brackets for securing a side airbag for an automotive vehicle.

In accordance with an exemplary embodiment, a bracket for securing a side airbag for an automotive vehicle, comprises: a mounting plate for securing the side airbag to the vehicle, including a body and a connection part formed on the body; and a bracket clip installed on the external surface of the connection part, and wherein the connection part has a through aperture through which a bolt is fastened and protrusions are each formed on each of both side ends of the connection part, and the bracket clip comprises: a bending part formed in the middle of the bracket clip; a plurality of support plates formed at both side of the bending part; and through apertures formed on the support plates, corresponding to the through aperture of the connection part.

In accordance with another exemplary embodiment, a bracket for securing a side airbag for an automotive vehicle, comprises: a bracket for fixing a connection strap which is configured to connect the side airbag to the vehicle, and wherein the bracket comprises: a support plate; an installation plate positioned at a middle upper part of the support plate and including an installation aperture; and a fixing part formed by being forwardly bent from the right and left edges, with respect to the installation plate, of the support plate.

In accordance with another exemplary embodiment, a bracket for securing a side airbag for an automotive vehicle, which connects a connection strap, connected to the side airbag, to a pillar of the vehicle, comprises: an installation aperture to be secured to the pillar; and a fixing bracket aperture through which the connection strap connected to the side airbag passes, and wherein the fixing bracket aperture comprises: a fixing bracket central aperture through which the connection strap passes; and extension apertures formed at both ends of the fixing bracket central aperture and each having a greater width than that of the fixing bracket central aperture.

In accordance with another exemplary embodiment, a bracket for securing a side airbag for an automotive vehicle, which is installed inside a roof side panel, comprises: a lower plate having a lower plate installation aperture and connection hooks each formed at the right and left of the lower plate installation aperture; an upper plate connected to one side of the lower plate and having an upper plate installation aperture and insertion apertures formed at the right and left of the upper plate installation aperture, each insertion aperture to which each connection hook is connected; and an extension plate extended downward the lower plate.

In accordance with another exemplary embodiment, a bracket for securing a side airbag to an automotive vehicle, comprises: a bracket clip made of a metal piece being bent, the bracket clip including a bending part, two support plates formed at either side of the bending part, and installation apertures respectively formed in the support plates; a body of the bracket; and, wherein the body of the bracket comprises: a restraint plate restraining a side airbag housing; a number of restraint members which are extended downwardly from at one side of the restraint plate and cover a side airbag housing, and a hook connection part which is extended and form at ends of the restraint members; and a connection part which is bent to be formed at the other side of the restraint panel and into which the bracket clip is inserted.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIGS. 2A and 2B show an example of another conventional side airbag;

DETAILED DESCRIPTION OF THE INVENTION

The present invention will now be described more fully hereinafter with reference to the accompanying drawings, in which preferred embodiments of the invention are shown.

This invention may, however, be embodied in different forms and should not be construed as limited to the embodiments set forth herein.

First Exemplary Embodiment

A bracket 100 for securing a side airbag for an automotive vehicle according to a first exemplary embodiment will be described, in detail, with reference to the accompanying drawings.

Figure 1A:
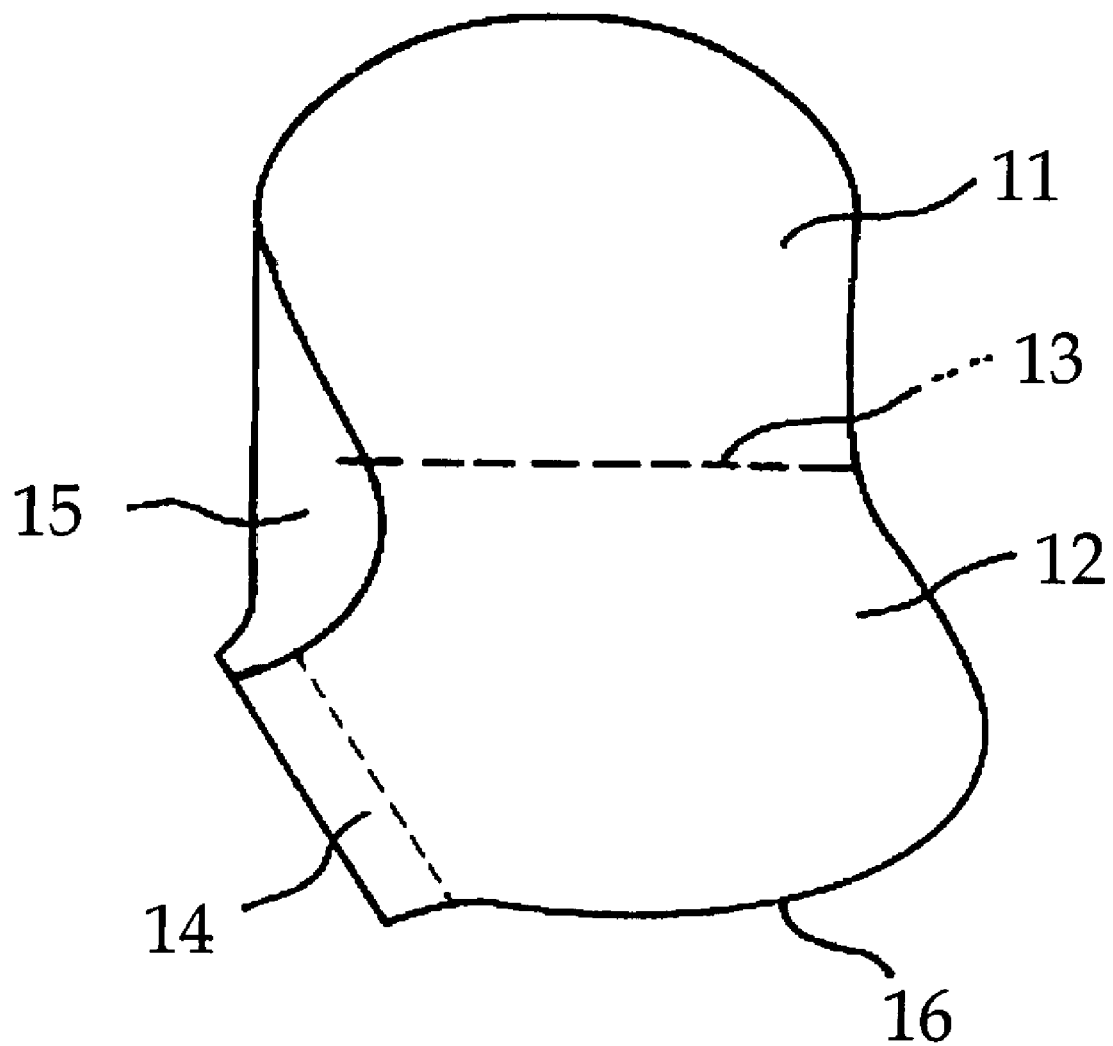
FIG. 1A shows an example of a conventional side airbag.
Figure 1B:
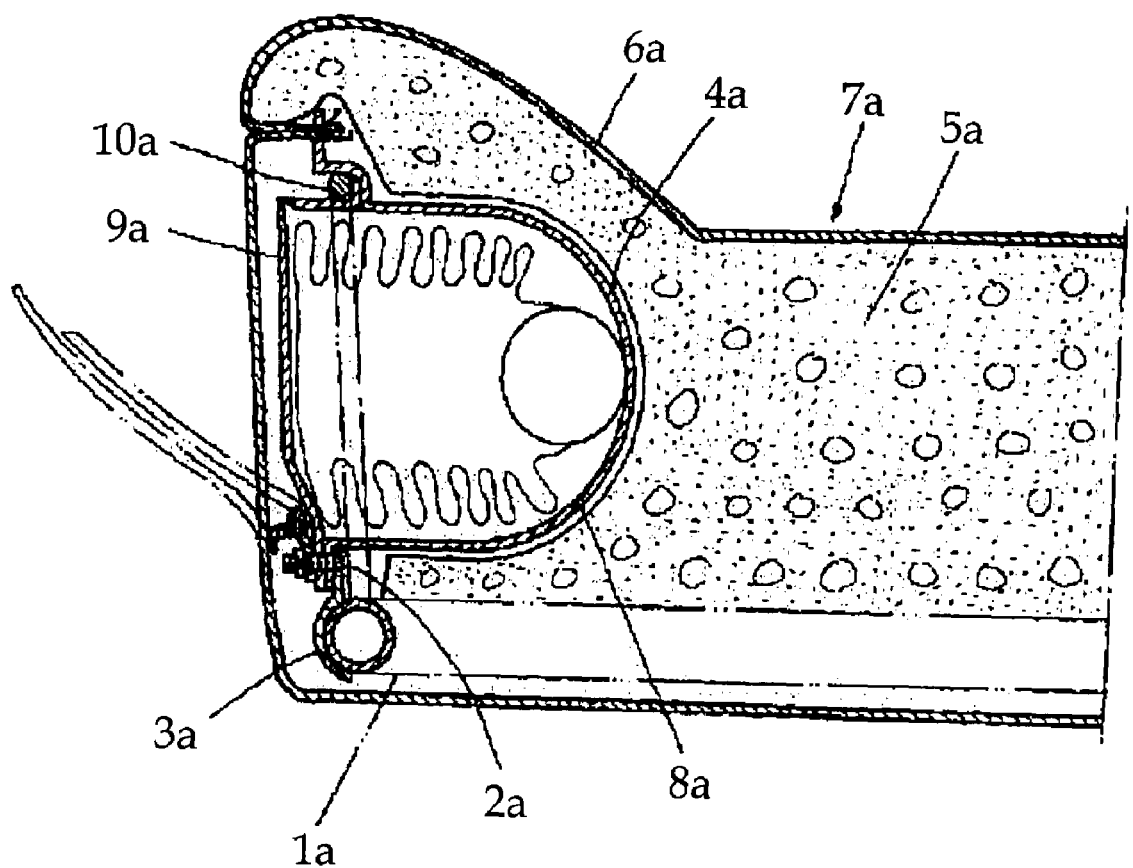
FIG. 1B shows an example of a conventional bracket for securing a side airbag.
Figure 3A:
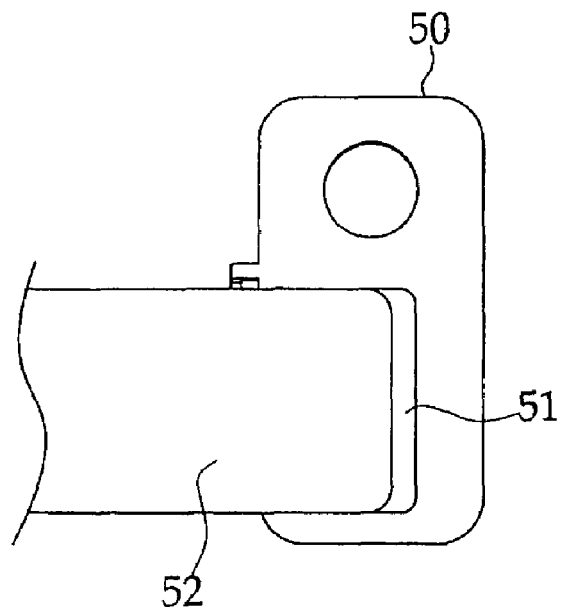
FIGS. 3A, 3B and 3C are front views of another conventional securing bracket.
Figure 3B:
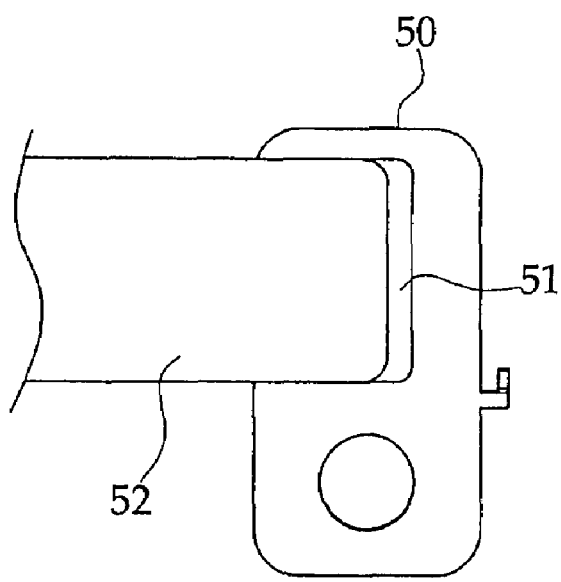
Figure 3C:
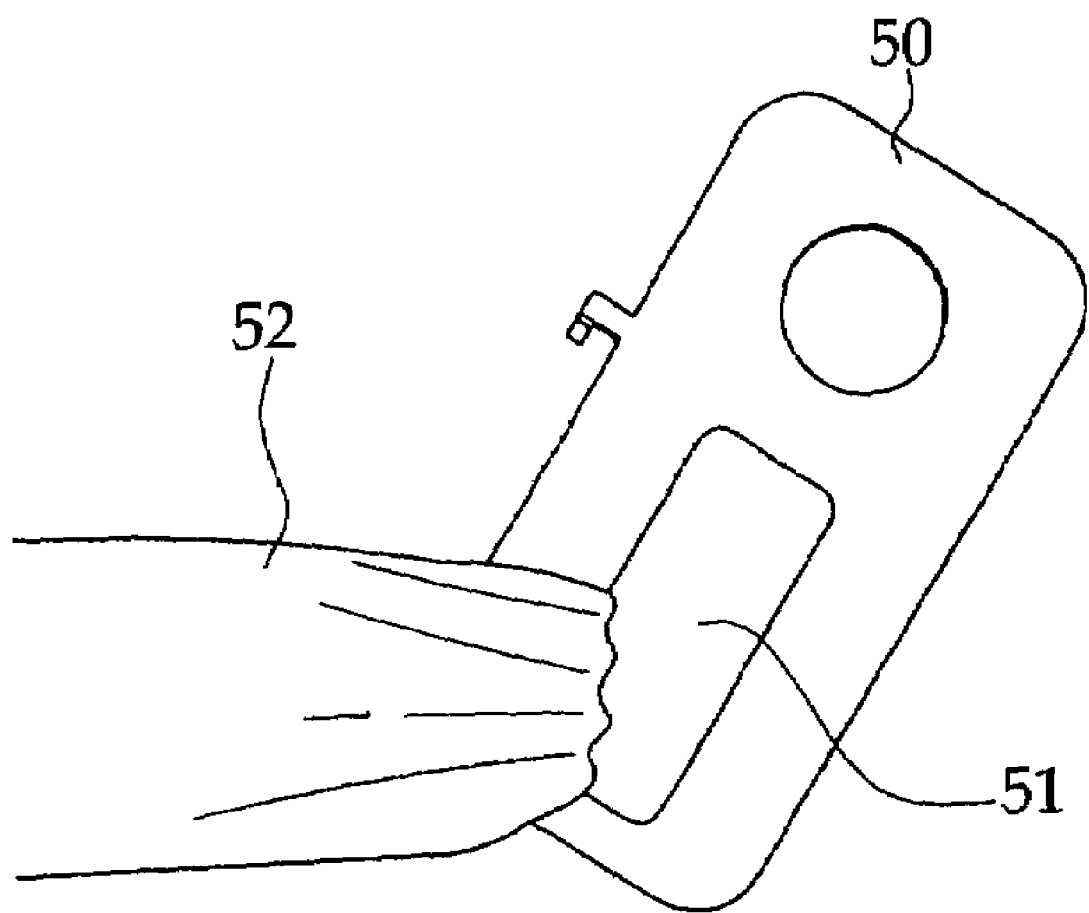
Figure 4A:
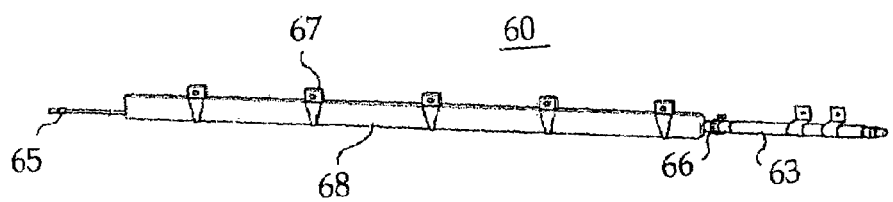
FIGS. 4A and 4B respectively show another conventional side airbag which is assembled and dissembled.
Figure 4B:
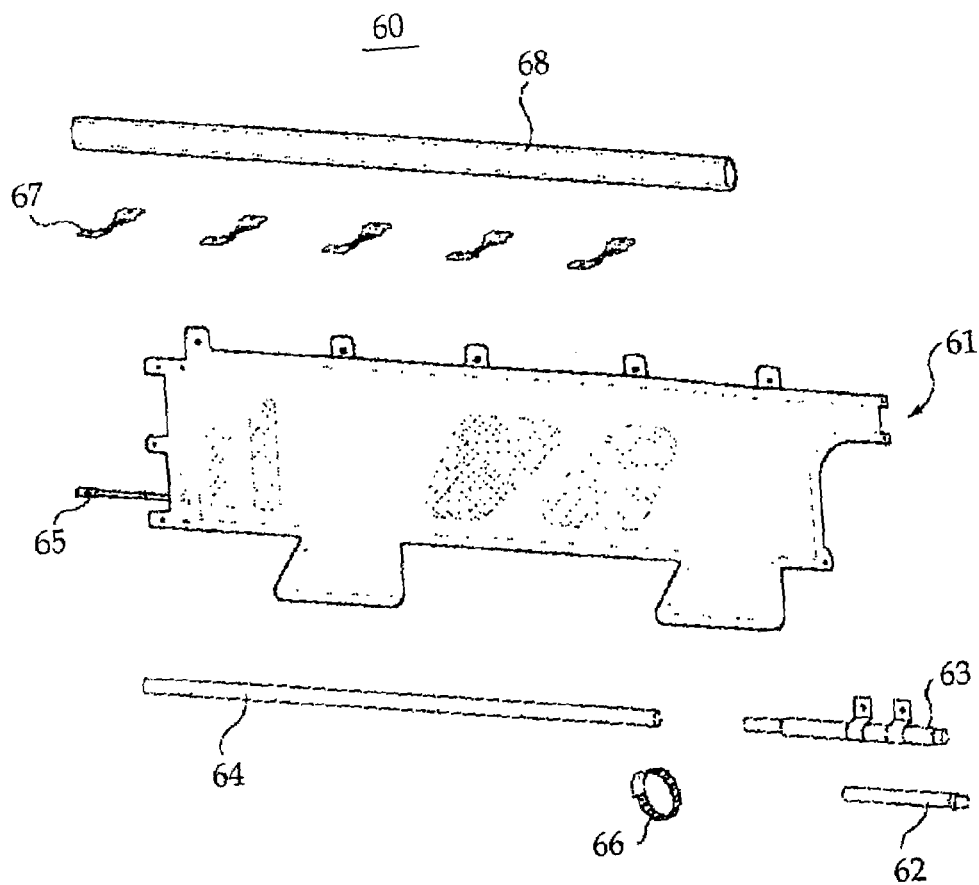
Figure 5:
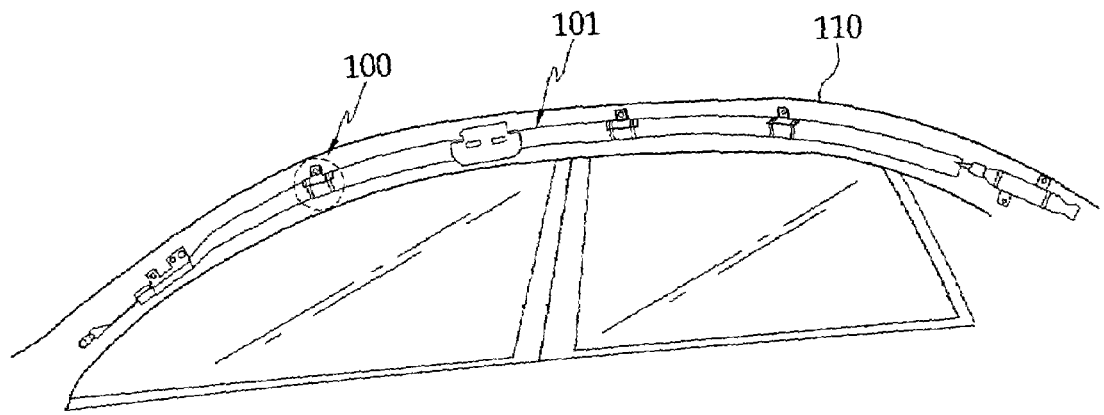
FIG. 5 shows a state of carrying out a bracket for securing a side airbag for an automotive vehicle according to a first exemplary embodiment of the present invention.
Figure 6:
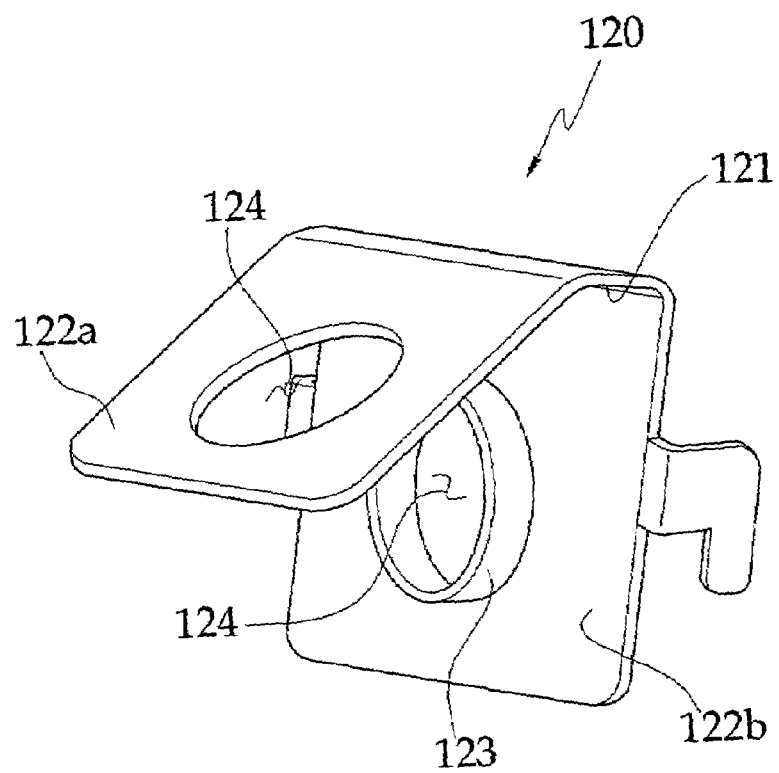
FIG. 6 is a perspective view of a bracket clip in the bracket according to the first exemplary embodiment.
Figure 7A:
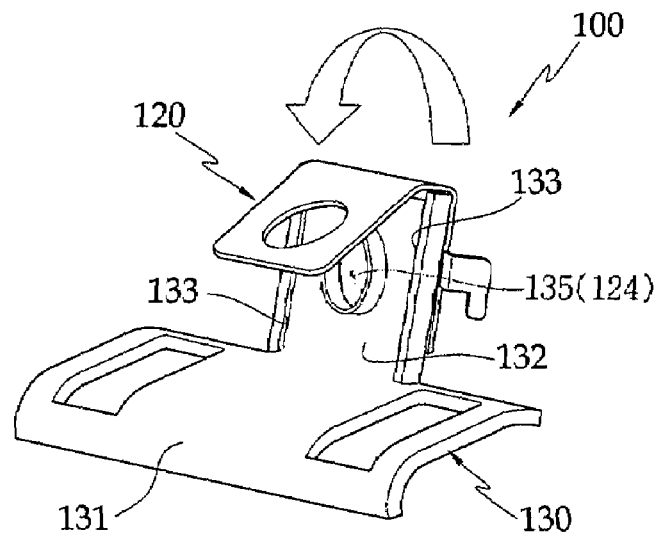
FIGS. 7A and 7B show examples of the bracket according to the first exemplary embodiment.
Figure 7B:
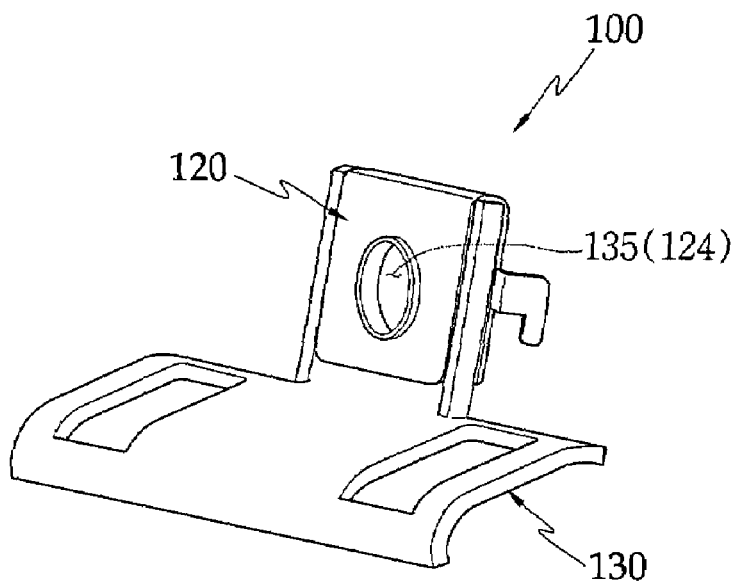

FIG. 5 shows a state of carrying out a bracket for securing a side airbag for an automotive vehicle according to a first exemplary embodiment of the present invention; FIG. 6 is a perspective view of a bracket clip in the device according to the first exemplary embodiment; and FIGS. 7A and 7B show examples of the bracket according to the first exemplary embodiment.

As illustrated in FIGS. 5, 6, 7A and 7B, a mounting plate 130 is a device for supporting a side airbag 101. The mounting plate 130 is installed to be secured to an upper frame (hereinafter, referred to as "A-pillar 110") of lateral windows by a bolt.

That is, the mounting plate 130 is manufactured by injection molding of plastics in a rectangular form. A bent connection part 132 is integrally formed with one side of a rectangular body 131, by injection molding.

A through aperture (135) through which a bolt (not shown) is fastened is formed in the center of the connection part 132. Predetermined protrusions 133 are respectively formed on an external surface of one side of the connection part 132, by protruding both side ends of the connection part 132 at a predetermined height.

A bracket clip 120 is a nearly rectangular metal plate as illustrated in FIG. 6. A bending part 121 is formed in the middle of the bracket clip 120. A plurality of support plates 122a and 122b are formed by being folded based on the bending part 121.

An aperture 124 is formed in each of the support plates 122a and 122b. The aperture 124 is aligned with the through aperture (not shown) of the connection part 132.

A predetermined ring-shaped rise 123 may be formed on an outer circumference of the aperture 124 which is formed on an inner surface of any one (for example, the support plate 122b) among the support plates 122a and 122b. The ring-shaped rise 123 is inserted into the through aperture (not shown) of the connection part 132.

Further, since the bracket clip 120 is to be held between the protrusions 133 formed in the connection part 132, the width of the bracket clip 120 is same as or less than the distance between the protrusions 133.

Assembling process of the bracket according to the first embodiment of the present invention will be described with reference to FIGS. 5, 6, 7A and 7B.

As illustrated in FIG. 7A, the bracket clip 120 is positioned at an external surface of the connection part 132. The bracket clip 120 is attached to the connection part 132 by inserting the ring-shaped rise 123 formed on one support plate 122b into the through aperture of the connection part 132 and by folding the other support plate 122a, so that the support plates 122a and 122b cover the external surface of the connection part 132.

As illustrated in FIG. 7B, assembling of the bracket 100 for securing a side airbag for an automotive vehicle according to the first exemplary embodiment of the present invention is completed.

The bracket 100 for securing a side airbag for an automotive vehicle, which is completely assembled in the above-described manner, is installed to be fixed onto the A-pillar 110 of a body of vehicle.

That is, after the connection part 132 connected to the bracket clip 120 is positioned at an appropriate position of the A-pillar 110, the bracket 100 for securing a side airbag for an automotive vehicle is secured by fastening the bolts (not shown) which is inserted into the aperture 124 formed on the support plates 122a and 122b of the bracket clip 120 and into the through-hole (not shown) of the connection part 132.

Then, even the bolt is too tightly fastened, since the bracket clip 120 formed of a metal material protects the connection part 132, the connection part 132 is prevented from being broken or deformed.

The side airbag 101 is secured against the lower surface of the body 131 of the mounting plate 130.

Second Exemplary Embodiment

A bracket 200 for securing a side airbag for an automotive vehicle according to a second exemplary embodiment will be described, in detail, with reference to the accompanying drawings.

The same reference numeral refers to the same element, and no further description of the same element will be presented.

Figure 8:
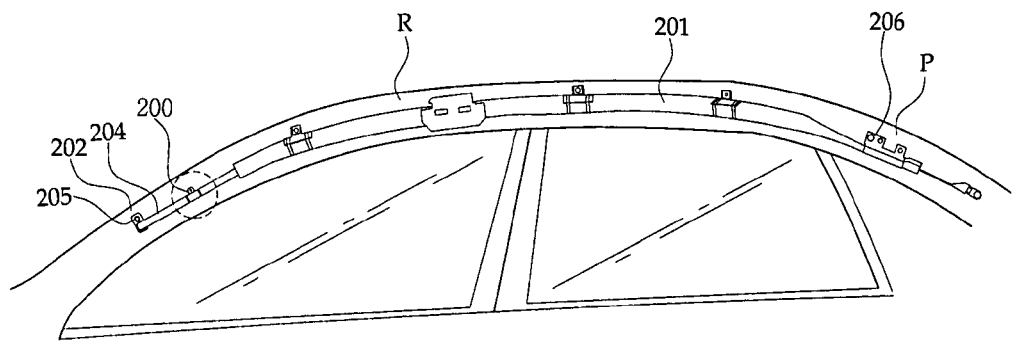
FIG. 8 is a front view of an installation position of a bracket for securing a side airbag for an automotive vehicle according to a second exemplary embodiment of the present invention.

FIG. 8 is a front view of an installation position of the bracket 200 for securing a side airbag for an automotive vehicle according to the second exemplary embodiment of the present invention.

As illustrated in FIG. 8, a side airbag 201 is mounted inside a roof side panel R of the vehicle. One end of the side airbag 201 is secured to a buckle 205 in an A-pillar 202, and the other end thereof is connected to a C-pillar P through an inflator 206.

The side airbag 201 and the buckle 205 are connected to each other by a connection strap 204. The bracket 200 fixing a path of the connection strap 204 is positioned in the middle part of the connection strap 204.

The side airbag 201 includes a sensor (not shown) for sensing a crash of the vehicle and an electronic control unit for operating the inflator 206 by receiving a signal from the sensor.

That is, the buckle 205 is fixed to the A-pillar 202 at the front part of the side airbag 201. The buckle 205 is connected to the side airbag 201 by the connection strap 204. The connection strap 204 is fixed by the bracket 200.

The inflator 206 including a gas for deploying the side airbag 201 is installed in the rear part of the side airbag.

Figure 9:
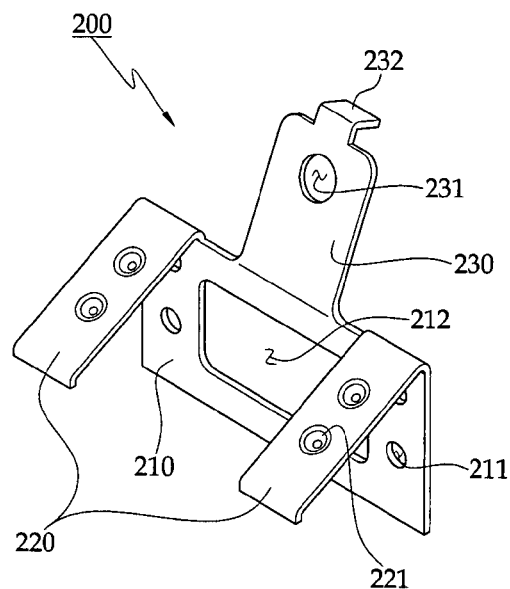
FIG. 9 is a perspective view of a shape of the bracket according to the second exemplary embodiment.
Figure 10:
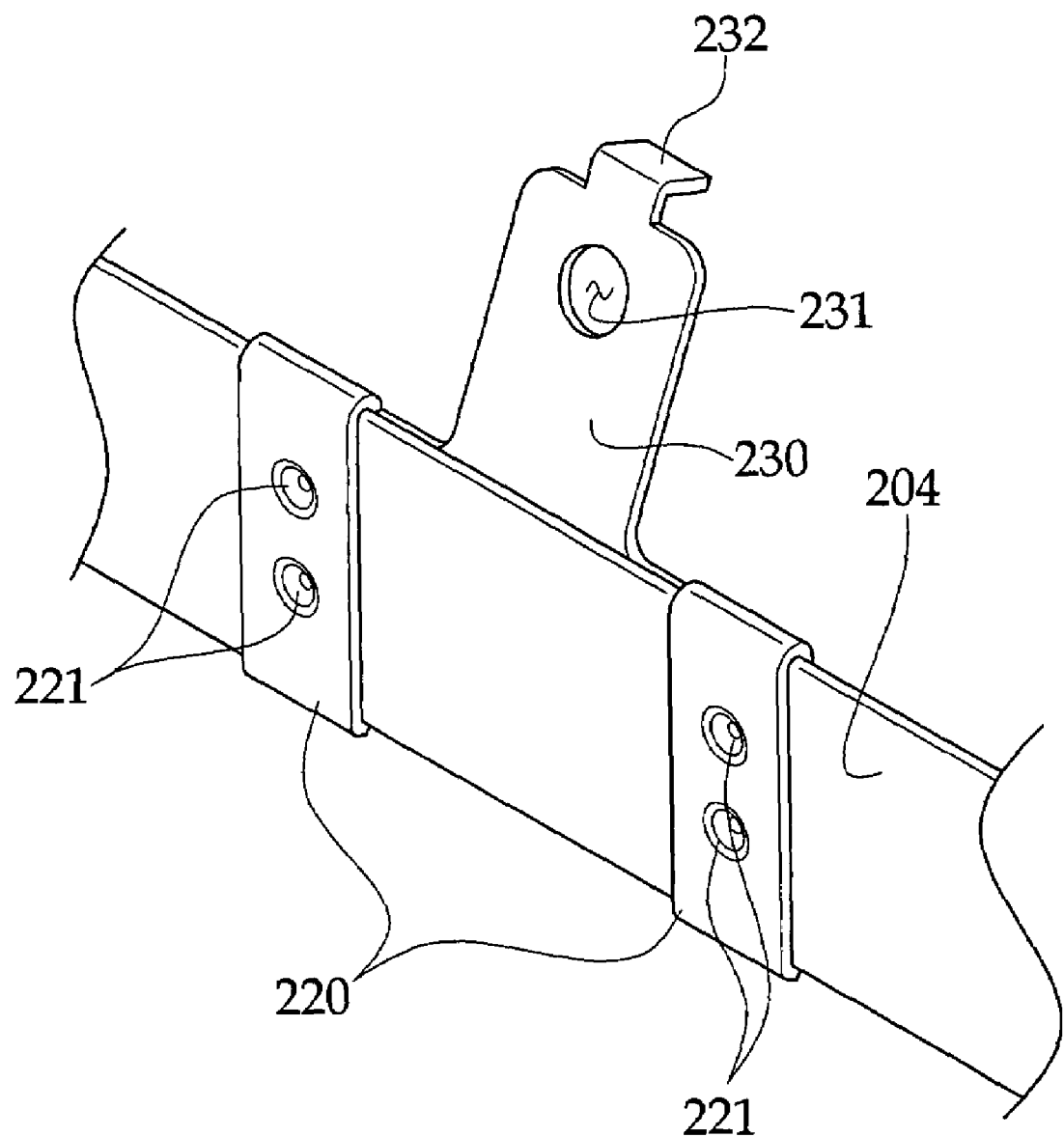
FIG. 10 is a perspective view of the constitution connecting the bracket of FIG. 9 to a connection strap.

FIGS. 9 through 11 are perspective views of a shape of the bracket 200 according to the second embodiment.

As illustrated, the bracket 200 comprises a support plate 210 and an installation plate 230. The installation plate 230 is formed by being bent from the support plate 210.

An installation aperture 231 is formed in the installation plate 230. When the side airbag 201 is installed in the vehicle, a bolt is fastened through the installation aperture 231. A hook 232 is formed on an upper end of the installation plate 230. The hook 232 makes it easy to be secured when the side airbag 201 is installed in the vehicle.

The support plate 210 is a part of directly fixing the connection strap 204. Fixing plates 220 are respectively formed to be bent at an upper end of both sides of the support plate 210.

Therefore, after the side airbag 201 is mounted in the vehicle, the fixing plates 220 are pressed so that the connection strap 204 is positioned between the fixing plates 220 and the support plate 210. Accordingly, the fixing plates 220, the connection strap 204 and the support plate 210 are secured to one another.

Two pairs of fixing protrusions 221 formed on the fixing plates 220 enable the connection strap 204 to be more stably fixed.

Further, a slimming aperture 212 in a rectangular form is made in the middle of the support plate 210, for cost reduction and weight reduction. Two pairs of apertures 211 are formed on both sides of the slimming aperture 212. The apertures 211 are positioned so as to correspond to the fixing protrusions 221 of the fixing plates 210, so that the fixing protrusions 221 are respectively inserted into the apertures 211.

FIG. 10 is a perspective view of a shape of the bracket 200 and the connection strap 204 according to the second exemplary embodiment.

As illustrated in FIG. 10, the fixing plates 220 of the bracket 200 are pressed to be fixed when the fixing plates 220 are assembled with the connection strap 204. Further, the fixing protrusions 221 to be inserted into the apertures 211 of the support plate 210 press the connection strap 204 to be fixed, without interference. Therefore, the security between the connection strap 204 and the fixing plates 220 is increased.

Figure 11A:
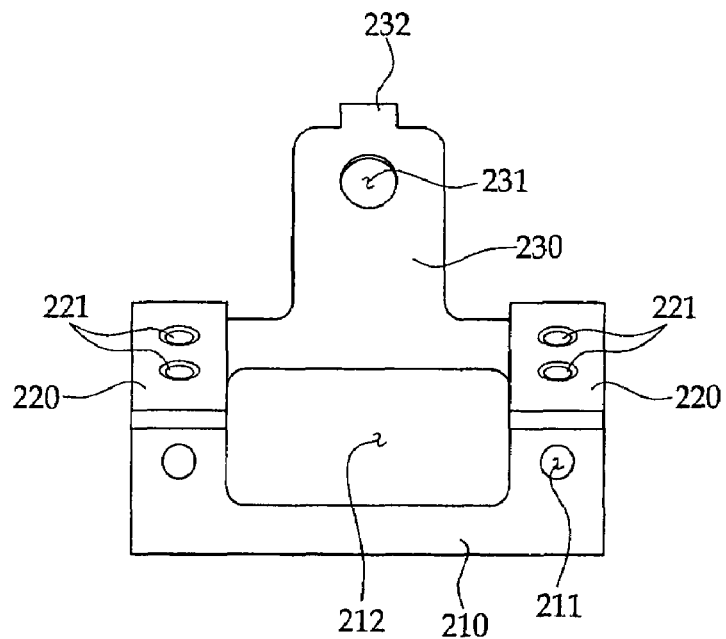
FIGS. 11A and 11B are respectively a front view and a side view of the bracket of FIG. 9.
Figure 11B:
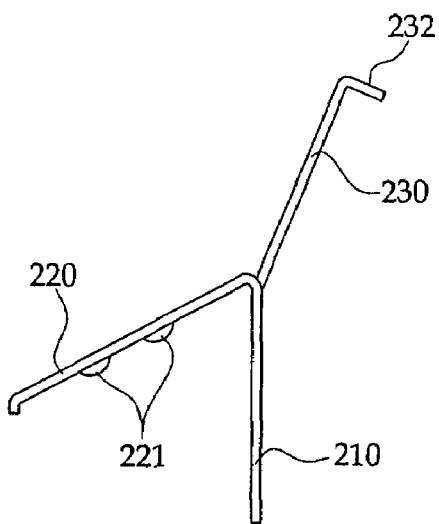

FIG. 11A is a front view of the bracket 200 and FIG. 11B is a side view of the bracket 200 according to the second exemplary embodiment.

As illustrated in FIGS. 11A and 11B, since the fixing plates 220 are bent to form an obtuse angle between the fixing plates 220 and the support plate 210, a bolt is easily fastened and the bracket 200 is secured to a body of the vehicle.

Further, the fixing plates 220 are bent towards the support plate 210 so that the pressing process is easy upon the assembling. The ends of the fixing plates 220 are slightly bent to hold the connection strap 204 downwardly when the fixing plates 220 are pressed to fix the connection strap 204. The slightly bending ends of the fixing plates 220 are one-touch connected to the downward edge of the support plate 210, thereby preventing the connection strap 204 from slipping out from the bracket 200.

Further, the description of the same constitution of third and fourth exemplary embodiments of the present invention as that of the second exemplary embodiments described above will not be further presented. The different constitution of the third and fourth exemplary embodiments from the second exemplary embodiment will be described in brief.

Third Exemplary Embodiment

Figure 12:
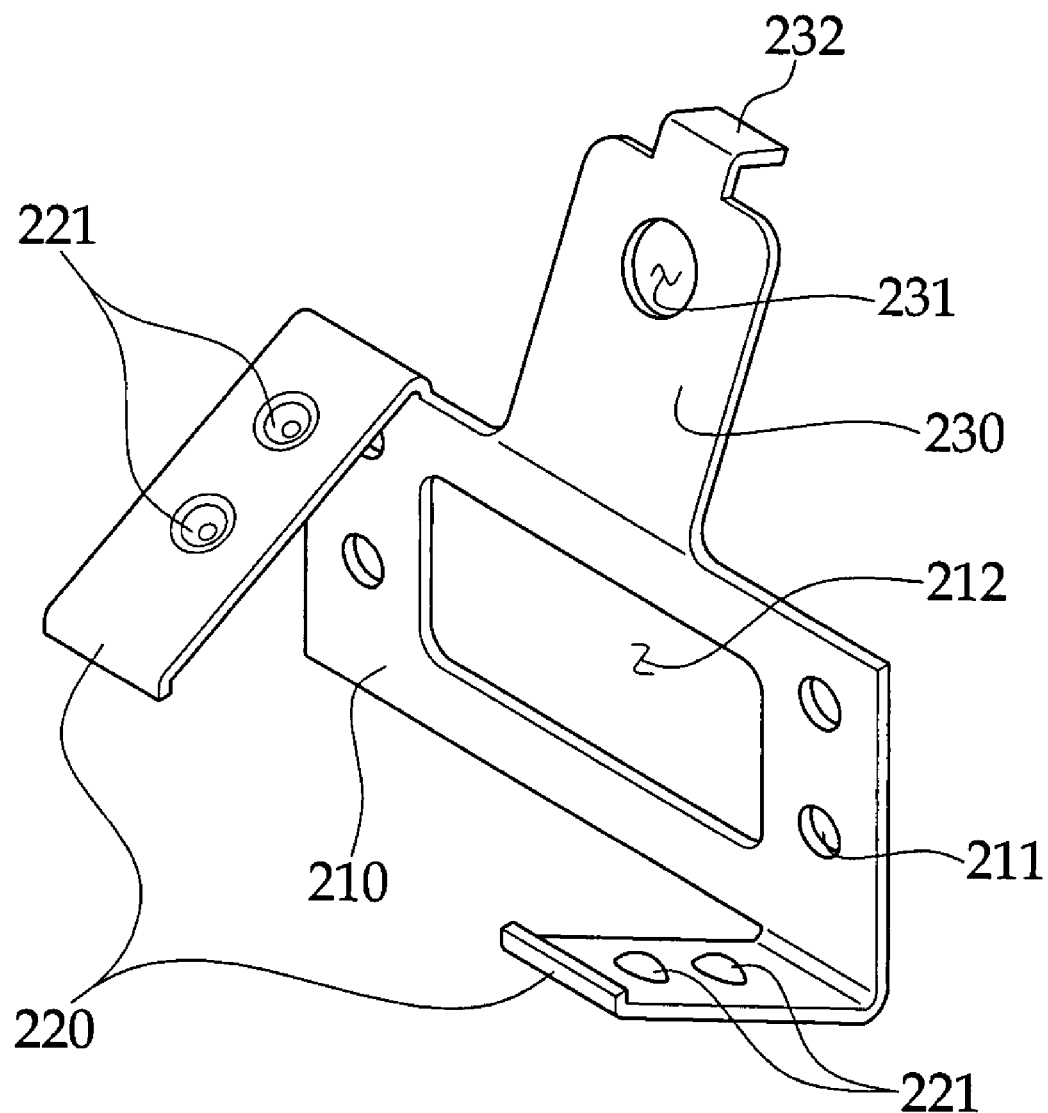
FIG. 12 is a perspective view of a bracket for securing a side airbag for an automotive vehicle according to a third exemplary embodiment of the present invention.

FIG. 12 is a perspective view of a bracket 200 for securing a side airbag for an automotive vehicle according to the third exemplary embodiment.

As illustrated in FIG. 12, one of fixing plates 220 in the bracket 200 is bent from an upper end edge of a support plate 210 and the other is bent from a lower end edge of the support plate 210, so that a connection strap 204 is prevented from slipping down.

Fourth Exemplary Embodiment

Figure 13:
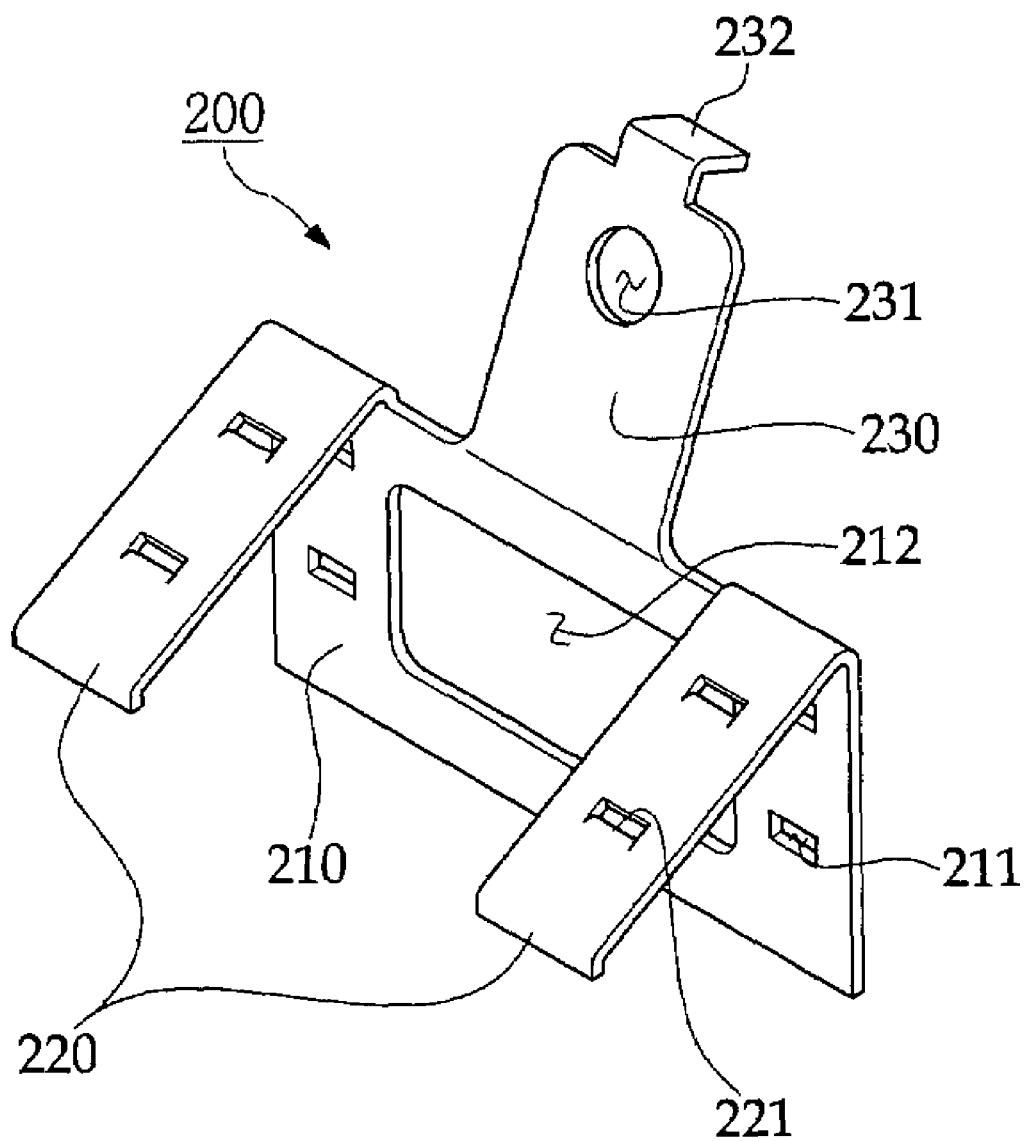
FIG. 13 is a perspective view of a bracket for securing a side airbag for an automotive vehicle according to a fourth exemplary embodiment of the present invention.

FIG. 13 is a perspective view of a bracket 200 for securing a side airbag for an automotive vehicle according to the fourth exemplary embodiment.

As illustrated in FIG. 13, fixing protrusions 221 of fixing plates 220 in the bracket 200 respectively have a square form. Specifically, the fixing plates 220 are cut in the other three sides, except for a lower end, at predetermined positions. The cut three sides in each position are bent to protrude towards the support plate 210, thereby preventing a connection strap 204 from slipping out. And holes 211 are formed to connect the fixing protrusions 221 in the support plate 210.

In accordance with the above-described present invention, the connection strap 204 which is formed to be extended to a side airbag 201 is fixed by the bracket 200 and the path of the connection strap 204 is fixed. Therefore, there is no interference between the connection strap 204 and the A-pillar when the side airbag 201 is assembled. Consequently, the efficiency of assembling in a manufacturing site is improved. Furthermore, since the connection strap 204 is easily lift when the side airbag 201 is deployed, it does not affect the deploying performance.

Fifth Exemplary Embodiment

A fifth embodiment of the present invention will be described with reference to FIG. 14 below.

Figure 14A:
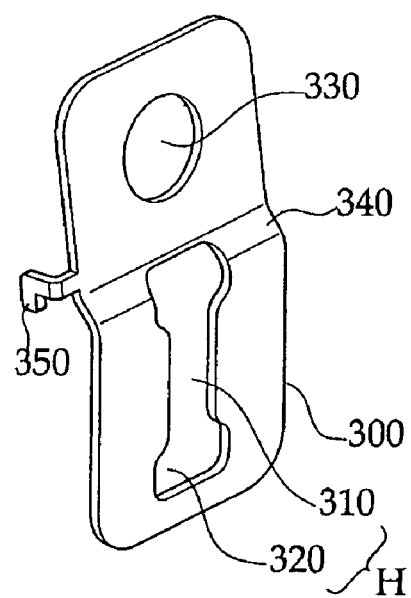
FIGS. 14A and 14B are perspective views of a bracket for securing a side airbag for an automotive vehicle according to a fifth exemplary embodiment of the present invention.
Figure 14B:
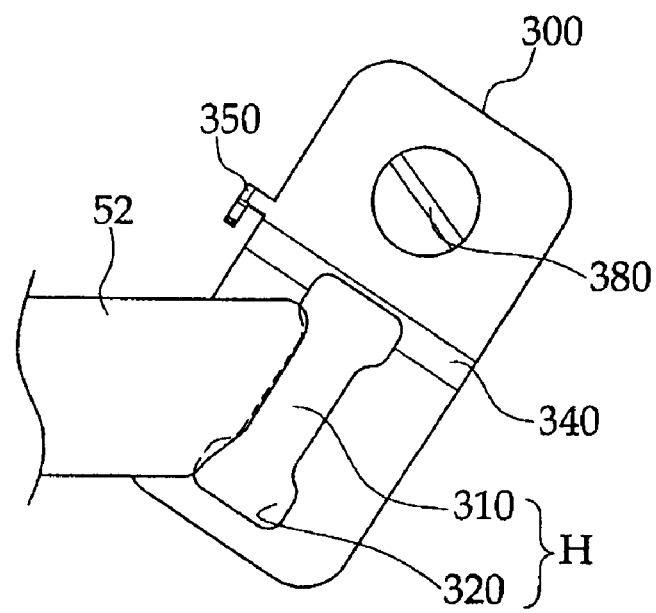

FIGS. 14A and 14B are perspective views of a bracket 300 for securing a side airbag for an automotive vehicle and a connection strap 52 connected to the bracket 300.

An installation aperture 330 and a fixing bracket aperture H are formed inside the bracket 300. The installation aperture 330 is to be secured to a pillar. The connection strap 52 connected to the side airbag passes through the fixing bracket aperture H. The fixing bracket aperture H includes a fixing bracket central aperture 310 and extension apertures 320 formed at both ends of the fixing bracket aperture H, to prevent the connection strap from turning. The width of the extension aperture 320 is greater than the width of the fixing bracket central aperture 310.

As illustrated in FIG. 14A, the bracket 300 comprises the installation aperture 330, a hook 350, the fixing bracket aperture H and a bending processed part 340. The installation aperture 330 secures the bracket 300 to a body of the vehicle by fastening a bolt to a frame of the vehicle. The hook 350 is of help in fixing the body of the vehicle. The fixing bracket aperture H is connected to the connection strap 52. The bending processed part 340 is formed between a part where the installation aperture 330 is formed and a part where the fixing bracket aperture H is formed. The bending processed part 340 is formed at angles and results in a step to be easily installed.

Further the fixing bracket central aperture 310 is a long aperture in a rectangular form. The extension apertures 320 are formed at both ends of the long aperture. The width of the extension apertures 320 is greater than the width of the long aperture, i.e., the fixing bracket central aperture 310. The connection parts between the extension apertures 320 and the fixing bracket central aperture 310 form a slope surface.

The two edges which are formed between the fixing bracket central aperture 310 and the extension apertures 320 restrains the movement of the connection strap 52, so that the bracket 300 does not turn before the side airbag is mounted in the vehicle. As a result, a failure is prevented.

When the side airbag is operated upon an unexpected accident during driving and even though the bracket 300 secured to the body of the vehicle by a bolt 380 is pulled towards the side airbag by the momentary explosive power of gas as shown in FIG. 14B, the connection strap 52 is maintained in the shape in which the connection strap 52 is first inserted into the fixing bracket aperture H. The connection strap 52 is not inclined toward one side or it is not cut.

When the side airbag is mounted in the vehicle in the manufacturing site, working is easy because there is no trouble of checking whether the condition of the bracket is good or bad and, if the bracket is turned, returning the bracket to its original position.

Sixth Exemplary Embodiment

Figure 15A:
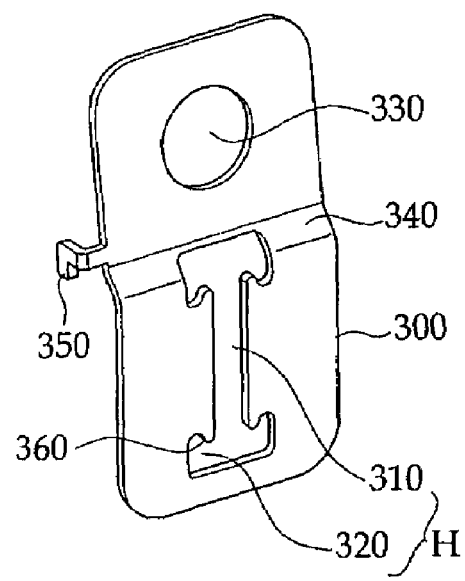
FIGS. 15A and 15B are perspective views of a bracket for securing a side airbag for an automotive vehicle according to a sixth exemplary embodiment of the present invention.
Figure 15B:
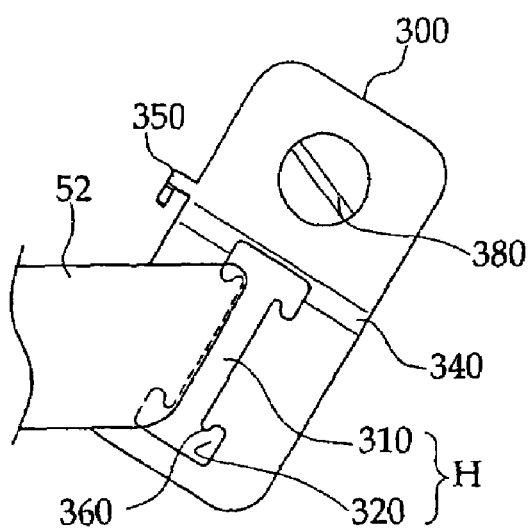

FIGS. 15A and 15B are perspective views of a bracket 300 for securing a side airbag for an automotive vehicle according to a sixth exemplary embodiment of the present invention.

The bracket 300 according to the sixth exemplary embodiment is similar to or same as the bracket 300 illustrated in FIGS. 14A and 14B, except for the shape of the fixing bracket aperture H. Therefore, the same reference numeral refers to the same element.

Four hooking protrusions 360 are formed around the connection parts where a fixing bracket central aperture 310 is connected to extension apertures 320 having the greater width than that of the fixing bracket central aperture 310. When a connection strap 52 moves, the connection strap 52 is held by the hooking protrusions 360, thereby preventing the connection strap 52 from being folded upward or downward and from being reversely turned. Therefore, the connection strap 52 is firmly fixed to the bracket 300.

Seventh Exemplary Embodiment

Figure 16A:
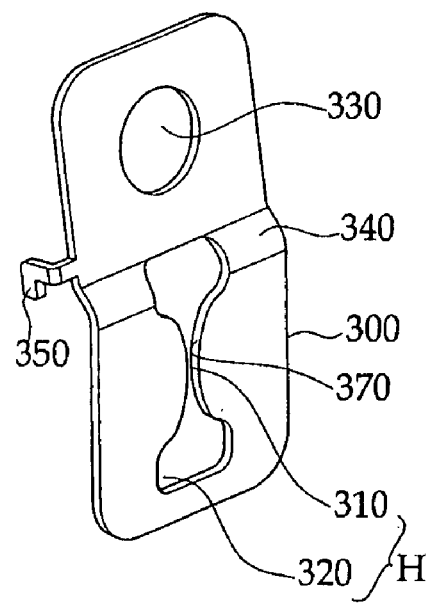
FIGS. 16A and 16B are perspective views of a bracket for securing a side airbag for an automotive vehicle according to a seventh exemplary embodiment of the present invention.
Figure 16B:
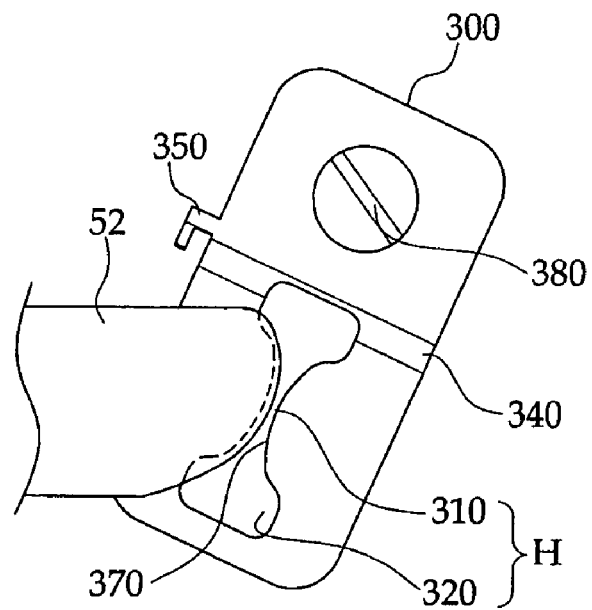

FIGS. 16A and 16B are perspective views of a bracket 300 for securing a side airbag for an automotive vehicle according to a seventh exemplary embodiment of the present invention.

The bracket 300 according to the seventh exemplary embodiment is similar to or same as the bracket 300 illustrated in FIGS. 14A and 14B, except for the shape of the fixing bracket aperture H. Therefore, the same reference numeral refers to the same element.

In the seventh exemplary embodiment, both sides of a fixing bracket central aperture 310, which are opposite to each other lengthwise, are curved to bulge towards the center of the fixing bracket central aperture 310. That is, the width of the fixing bracket central aperture 310 becomes progressively narrower toward the middle part thereof.

In accordance with the above-described present invention, the connection strap 52 connected to the side airbag is prevented from being folded or inclined downward. Therefore, a passenger is protected by installing the bracket 300 which enables the side airbag to be properly operated upon a side crash of the vehicle.

Eighth Exemplary Embodiment

An eighth exemplary embodiment of the present invention will be described with reference to FIGS. 17, 18A, 18B and 19.

Figure 17:
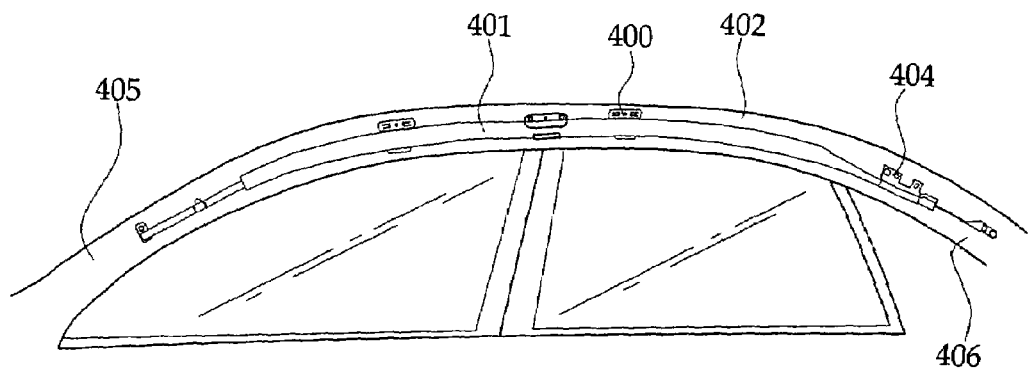
FIG. 17 is a front view of an installation position of a bracket for securing a side airbag for an automotive vehicle according to an eighth exemplary embodiment of the present invention.

FIG. 17 is a front view of an installation position of a bracket 400 for securing a side airbag 401 for an automotive vehicle according to the eighth exemplary embodiment of the present invention.

As illustrated in FIG. 17, a front part of the side airbag 401 which is installed inside a roof side panel 402 is secured to a front pillar 405, and a rear part of the side airbag 401 with an inflator 404 is connected to a rear pillar 406.

At least one or more brackets 400 are installed inside the roof side panel 402. The side airbag 401 includes a sensor and an electronic control unit. The sensor senses a crash of the vehicle, and the electronic control unit operates the inflator 404 by receiving a signal form the sensor.

Figure 18A:
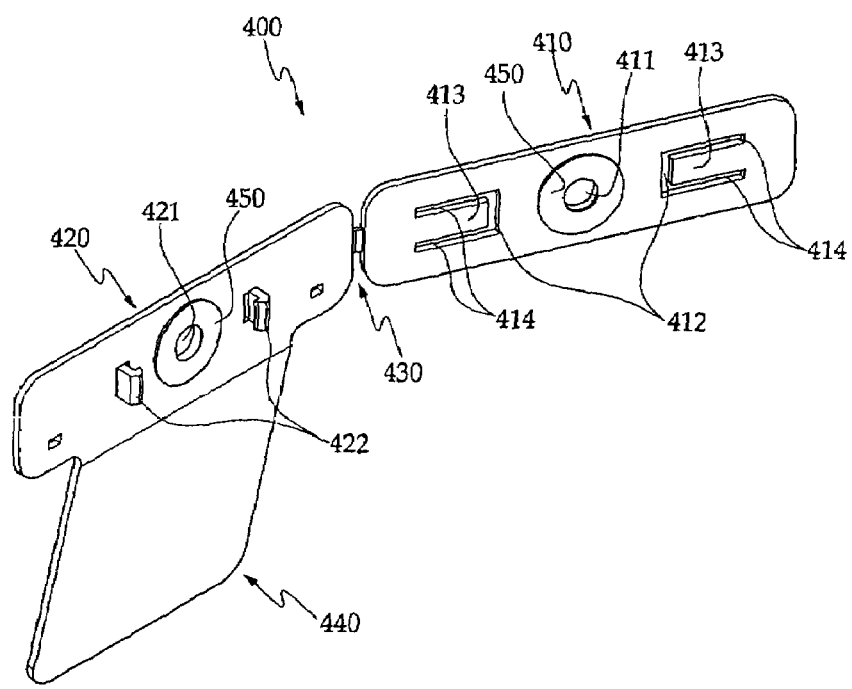
FIGS. 18A and 18B show an open state of the bracket according to the eighth exemplary embodiment.
Figure 18B:
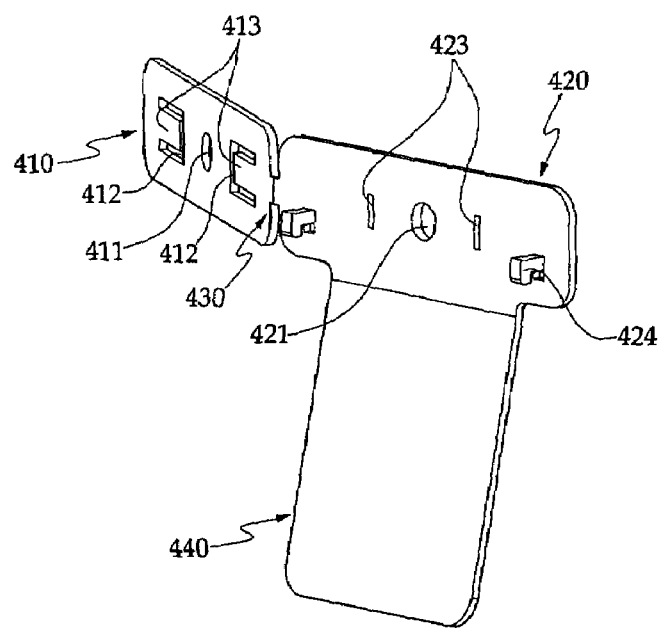

FIGS. 18A and 18B show the bracket according to the eighth exemplary embodiment.

As illustrated in FIGS. 18A and 18B, the bracket 400 comprises a lower plate 420, an upper plate 410 and an extension plate 440. The lower plate has connection hooks 422. The upper plate 410 is horizontally connected to one side of the lower plate 420 by a joint strap 430. The extension plate 440 is extended from the lower plate 420 downwardly. The bracket 400 restrains a side airbag 401 as the upper plate 410 is connected to the lower plate 420.

The lower plate 420 comprises: a lower plate installation aperture 421 for fastening a bolt to the roof side panel 402; hooking protrusions 424 for assisting the securing of the bracket 400 to the roof side panel 402 and for restraining rotation of the bracket 400; and connection hooks 422 formed at the right and left of the lower plate installation aperture 421 and secured to the upper plate 410.

Each hooking protrusion 424 is connected to any one side of the square-shape aperture formed in the lower plate 420 and is formed by bending the back surface of the lower plate 420 which is secured to the roof side panel 402, as illustrated in FIG. 18B.

Before the bracket 400 is fastened to the roof side panel 402 by the bolt, the bracket 400 is held by a hook groove (not shown) formed on the roof side panel 402. Therefore, working becomes easy because there is no trouble of holding the bracket 400 when it is fastened by the bolt.

Further, the bracket 400 is prevented from turning by a rotation force generated when the bracket 400 is fastened by the bolt.

The connection hooks 422 for connection to the upper plate 410 are formed to vertically protrude from the other surface of the lower plate 420 on which two hook apertures 423 are formed. Further, since the end parts of the connection hooks 422 are bent to face each other, when connecting to the upper plate 410, the connection hooks 422 restrain the upper plate 410 so as not to be easily deviated.

The hook apertures 423 make it easy for the connection hooks 422 to move, so that the connection hooks 422 are prevented from being easily broken when connecting to or separating from the upper plate 410.

The upper plate 410 is connected to be level to the lower plate 420 by the joint strap 430 formed at one side thereof. An upper plate installation aperture 411 is formed on the upper plate 410, to correspond to the lower plate installation aperture 421.

Insertion apertures 412 are formed on the upper plate 410, at the positions corresponding to the connection hooks 422 of the lower plate 420, so that the connection hooks 422 are inserted into the insertion apertures 412.

Spacing apertures 414 are formed at both ends of each of the insertion apertures 412. A movable plate 413 is included between the spacing apertures 414. One end of the movable plate 413 is connected to the upper plate 410, so that the connection hooks 422 and the insertion apertures 412 are prevented from being damaged when they are connected to or separated from each other.

The extension plate 440 is extended from a lower end part of the lower plate 420 and is bent at an obtuse angle towards the roof side panel 402. Therefore, the bracket 400 is increasingly secured to a body of the vehicle and the direction of deploying the side airbag cushion 409 is guided when the side airbag is operated.

A reinforcement protrusion 450 is integrally formed, at a predetermined height, around the lower plate installation aperture 421 at one side of the lower plate 420. The reinforcement protrusion 450 functions as a washer which prevents the bracket 400 from being seriously damaged by strong torque when the bracket 400 is fastened by the bolt and prevents both ends of the bracket 400 from being spaced when the bolt is unnecessarily deeply screwed.

Another reinforcement protrusion 450 is formed around the upper plate installation aperture 411. Therefore, when the upper plate 410 is assembled with the lower plate 420, securing of the end of the side airbag 401 is improved.

Figure 19:
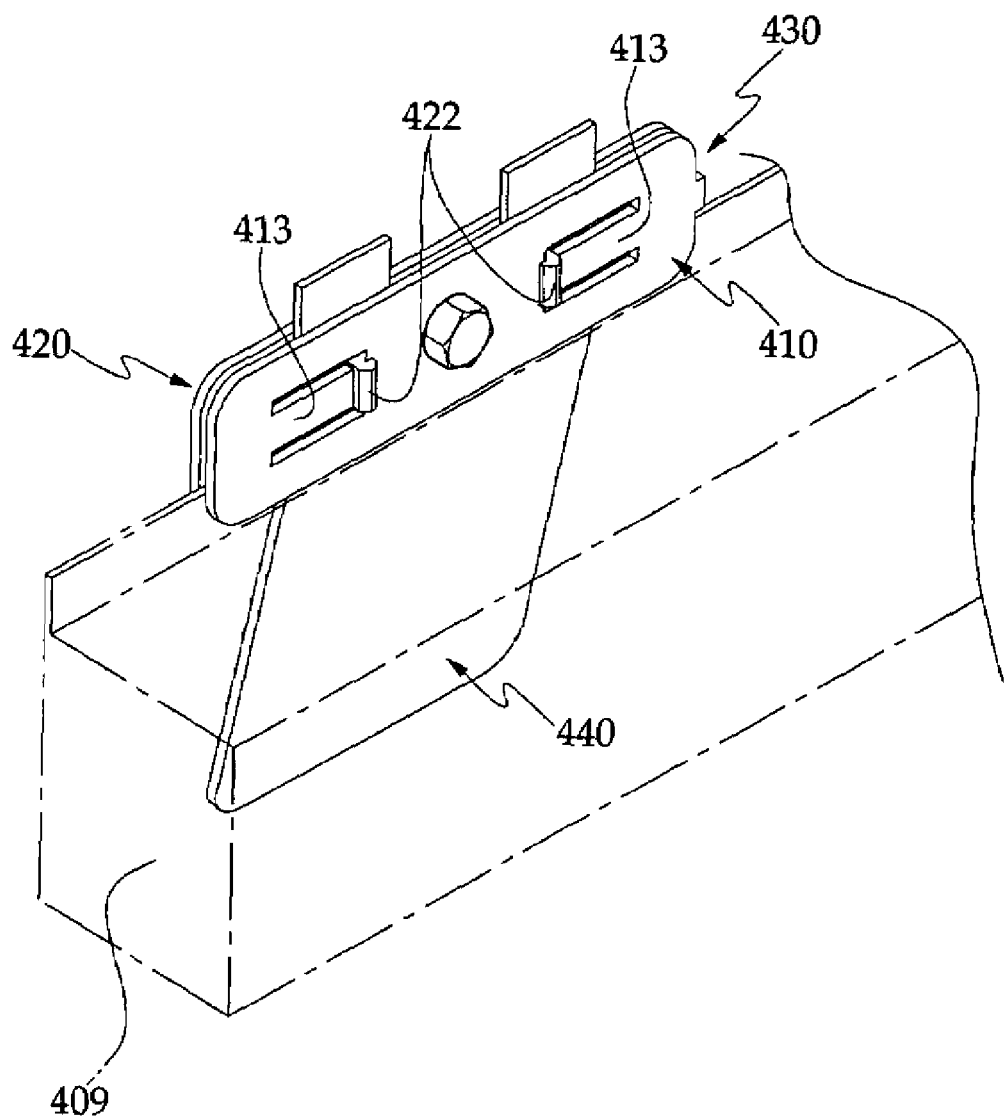
FIG. 19 shows a use example of the bracket according to the eighth exemplary embodiment.

A manufacturing structure of the bracket according to this embodiment will be described with reference to FIG. 19.

The one end of the side airbag 401 is fabricated to integrally protrude is inserted into the connection hooks 422 of the lower plate 420. The upper plate 410 connected by the joint strap 430 is covered over the lower plate 420. The connection hooks 422 of the lower plate 420 are inserted into the insertion apertures 412 formed on the upper plate 410.

Then, the connection hooks 422 are more easily connected to the insertion apertures 412 by the motion of the movable plate 413. Upon wrong assembly, it is possible to artificially dissemble the bracket 400.

Since the upper plate installation aperture 411 and the lower plate installation aperture 42 are formed at the corresponding positions, they are aligned to make it easy to fasten by the bolt.

Ninth Exemplary Embodiment

A ninth exemplary embodiment of the present invention will be described with reference to FIGS. 20, 21A and 21B.

As illustrated, a front part of a side airbag housing which is installed inside a roof side panel is secured in a front pillar and a rear part thereof including an inflator is secured in a rear pillar.

Then, one or more holders are installed to cover the side airbag housing inside the roof side panel and the holders secure the side airbag housing to a body of an automotive vehicle.

A side airbag module includes a sensor (not shown) sensing a crash of the vehicle, and an electronic control unit (not shown) operating the inflator by receiving a signal transmitted from the sensor.

Figure 20:
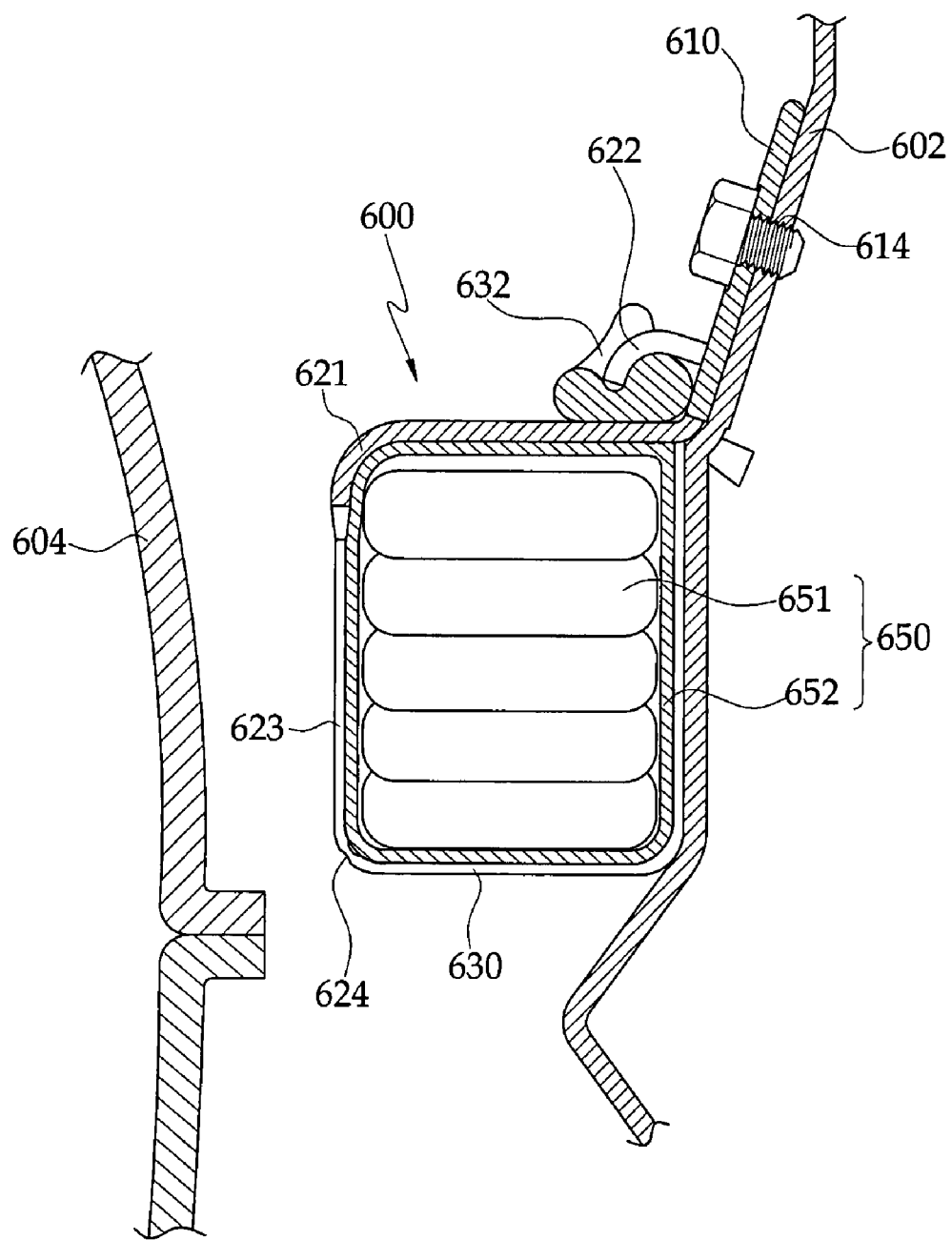
FIG. 20 is an installation sectional view of a bracket for securing a side airbag for an automotive vehicle according to a ninth exemplary embodiment of the present invention.

FIG. 20 is a sectional view illustrating an installation structure of a bracket 600 for securing a side airbag for an automotive vehicle according to the ninth exemplary embodiment.

As illustrated, the bracket 600 is positioned between a roof side panel 602 and a headliner 604 and is fastened to the roof side panel 602, through an installation aperture 614 formed in a bracket clip 610, by a bolt.

A restraint member 623 of the bracket 600 is installed to cover a side airbag housing 650. A cut part 624 is positioned nearby a headliner 604, to be easily parted and deployed inside the vehicle when a side airbag cushion 651 is deployed.

Figure 21A:
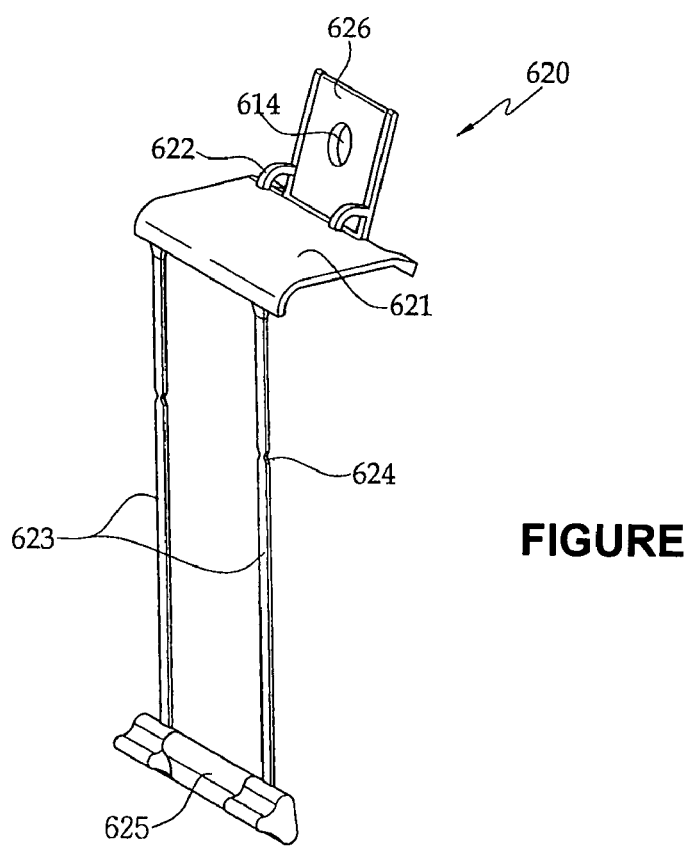
FIGS. 21A and 21B show the bracket according to the ninth exemplary embodiment.
Figure 21B:
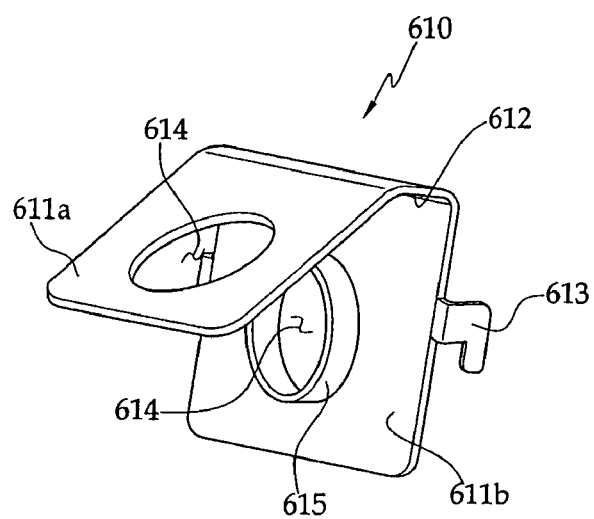

FIGS. 21A and 21B show a shape of the bracket 600 according to the ninth exemplary embodiment.

As illustrated in FIG. 21A, a body of the bracket 600 is made of plastics and comprises a restraint plate 621, a connection part 626, and a restraint member 623. The restraint plate 621 restrains an upper part of the side airbag housing 652. The connection part 626 is formed on one side of the restraint plate 621. The restraint member 623 covers the side airbag.

Securing hooks 622 to be connected to a hook connection part 625 (to be described later) are formed at both sides of the connection part 626 and extended toward the restraint plate 621.

The restraint plate 621 restrains the upper part of the side airbag housing 652. The connection part 626 is connected to the restraint plate 621 and is formed at an obtuse angle at one side of the restraint plate 621. The bracket clip 610 illustrated in FIG. 21B is fitted with the connection part 626, to be secured to the body of the vehicle.

Further, one or more restraint members 623 respectively including the cut parts 624 are connected to the other side of the restraint plate 621. The hook connection part 625 to be connected to the securing hooks 622 is formed at the end of each restraint member 623.

The cut part 624 positioned in the middle part of each restraint plate 623 is cut at a predetermined part, to be easily parted when the side airbag housing 652 is deployed.

As illustrated in FIG. 21B, the bracket clip 610 is a metal piece made of an iron material. In the bracket clip 610, two support plates 611a and 611b are formed based on a bending part 612.

The thickness of the bending part 612 of the bracket clip 610 is same as or a little thicker than the thickness of the connection part 626, to cover the connection part 626. The width of the bracket clip 610 is same as or a little narrower than the protruded connection part 626.

A ring-shaped rise 615 is formed on an outer circumference of the installation aperture 614 on the inner surface of any one of the two support plates 611a and 611b. The ring-shaped rise 615 passes through the aperture 614 of the connection part 626 and is inserted into the other support plate 611a or 611b.

Each of the apertures in the support plate 611a, the connection part 626 and the support plate 611b is formed at the same position, to make it easy to fasten the bolt.

Hooking protrusions 613 are respectively formed at both side ends of the support plate 611a or 611b which is secured to the roof side panel 602. The hooking protrusions 613 are hooked in hook grooves (not shown) formed on the roof side panel 602 before the bolt is screwed.

Therefore, since an operator does not need to hold the bracket 600 by hand or any additional tool before the bracket 600 is fastened to the body of the vehicle by the bolt, the installation is simple and the working time is shortened. Further, since the bracket clip 610 is prevented from turning by the rotation force generated when the bolt is screwed, the installation work is easier.

Further, since the bracket is made of the iron material, a fastened part is not seriously damaged in spite of the excessive rotation force and fastening when the bolt is screwed.

Figure 22A:
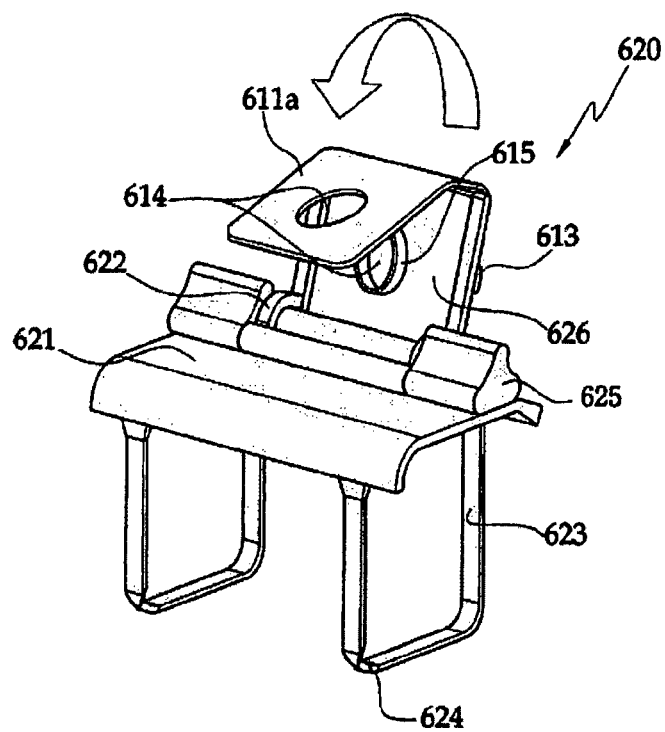
FIGS. 22A and 22B show a bracket for securing a side airbag for an automotive vehicle according to a ninth exemplary embodiment of the present invention.

As illustrated in FIG. 22A, a bracket clip 610 with folded support plates 611a and 611b covers a connection part 626, thereby allowing a ring-shaped rise 615 formed on any one support plate 611a or 611b to be inserted into an installation aperture 614 of the connection part 626 and subsequently to be inserted into the other support plate 611a or 611b while hooking protrusions 613 of the bracket clip 610 are hooked in hook grooves (not shown) of a roof side panel 602.

Figure 22B:
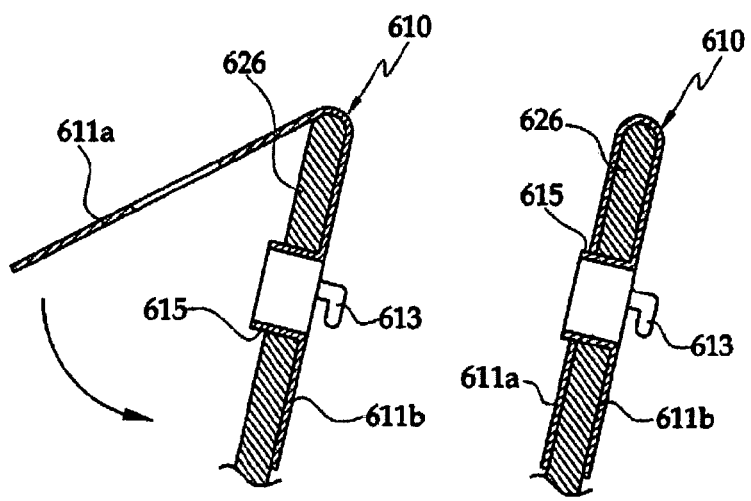

FIG. 22B shows a section view of the installed bracket clip 610. As illustrated, the ring-shaped rise 615 formed in the inner side of the support plate 611b of the bracket clip 610 is inserted into the connection part 626 from the back side of the connection part 626. Subsequently, the ring-shaped rise 615 protruding from the connection part 626 is inserted into the installation aperture 614, which is formed on the other support plate 611a which is bent over the upper part of the connection part 626. Therefore, a body 620 is secured by the bracket clip 610.

Figure 23A:
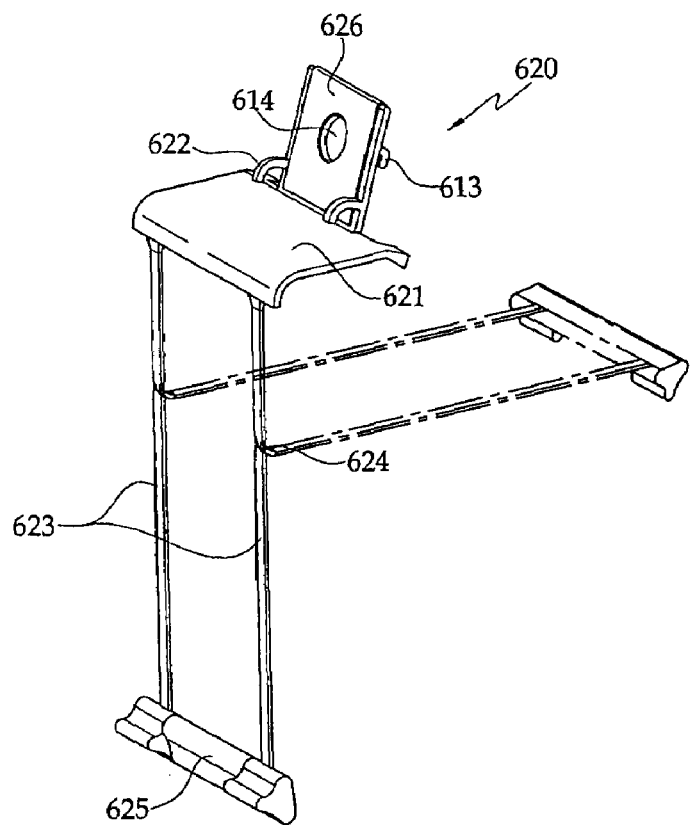
FIGS. 23A and 23B show the bracket according to the ninth exemplary embodiment.
Figure 23B:
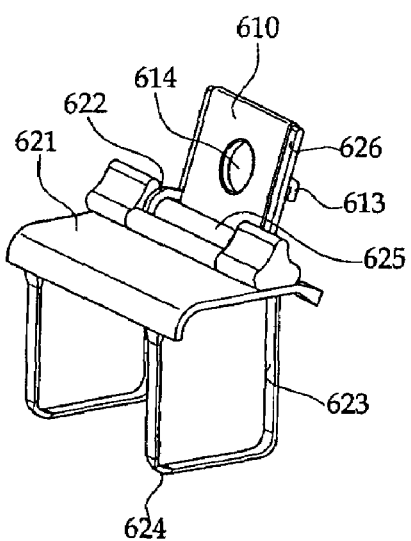

FIGS. 23A and 23B show mounting of the bracket 600 according to the tenth exemplary embodiment.

As illustrated in FIG. 23A, restraint members 623 are respectively firstly bent at cut parts 624. As illustrated in FIG. 23B, the restraint members are respectively secondarily bent at the parts which are same as a restraint plate 621 in width, to cover a side airbag housing 652.

After turning a part of the hook connection part 625 connected to the restraint members 623 from the back of the bracket clip 610 to the front of the bracket clip 610, the secondarily bent restraint members 623 allow the hook connection part 625 to be hooked into the securing hooks 622 positioned at both side of the connection part 626.

Both side ends of the hook connection part 625 are greater in size than the other parts hooked into the securing hooks 622, thereby restraining the bracket 600 from being shaken side to side, to be more stably secured.

In the bracket for securing a side airbag for an automotive vehicle according to the exemplary embodiment of the present invention, when the bracket is fastened by a bolt, the bracket is prevented from being broken or deformed, by protecting the bolt fastened bracket formed on a mounting plate, and the side airbag is maintained in the best condition.

In the second to fourth exemplary embodiments of the present invention, the path of the connection strap connecting the side airbag to the bracket is fixed by the bracket and there is no interference by the connection strap when the bracket is assembled to install the side airbag in the A-pillar, thereby improving the assembling efficiency in the manufacturing site, to save time and improve productivity.

In the bracket for securing a side airbag for an automotive vehicle according to the exemplary embodiments of the present invention, since the connection strap is allowed to be easily released when the side airbag is deployed, it does not affect the deploying performance.

Consequently, waste due to unnecessary processes in the manufacturing site is eliminated, the assembling efficiency is improved, and upon an accident, the passenger is effectively protected because the deploying performance of the side airbag is not affected.

In the bracket for securing a side airbag for an automotive vehicle according to each of the fifth to seventh exemplary embodiments of the present invention, since the connection strap connected to the bracket is prevented from turning, a failure is prevented while the side airbag is mounted. Further, even though the bracket is turned by the force generated when the mounted side airbag is operated upon an unexpected accident, since the fixing string is secured, it is prevented from being overlaid or inclined towards one side so that the side airbag is normally operated.

Furthermore, since the side airbag can be easily mounted in the manufacturing site, the working time is shortened and the productivity is improved. In the bracket for securing a side airbag for an automotive vehicle according to the eighth exemplary embodiment of the present invention, since the bracket is constituted in a single product to restrain the side airbag cushion, the working procedure in the working site is simplified and easy.

Furthermore, since the bracket has the combination structure in which the upper plate and the lower plate are easily connected and separated, when it is erroneously assembled, it is easily separated without causing any damage to the product.

In the bracket for securing a side airbag for an automotive vehicle according to each of the ninth exemplary embodiments of the present invention, since the side airbag housing is restrained without any additional components, the cost is reduced and working time is shortened in the manufacturing site.

Further, since the materials having two different characteristics are used for the function of the bracket, there is no damage or performance failure in the materials. Furthermore, since the cut parts are easily parted, the side airbag cushion is smoothly deployed.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A bracket for securing a side airbag for an automotive vehicle, comprising a lower plate having a lower plate installation aperture passing therethrough, and an upper plate having an upper plate installation aperture passing therethrough, in which when the upper plate is coupled to the lower plate, the upper plate installation aperture is communicated with the lower plate installation aperture, characterized in that one side of the upper plate is connected to one side of the lower plate by a joint strap, an extension plate extends downwardly from the lower plate, connection hooks are formed to protrude from one surface of the lower plate and disposed at the right and left of the lower plate installation aperture, hook apertures are formed in the lower plate and adjacent to the connection hooks, and insertion apertures pass through the upper plate and is disposed at the right and left of the upper plate installation aperture, and a movable plate extends towards an inner end of the insertion apertures from an outer end of the insertion aperture and the inner end, a lower end and an upper end of the insertion apertures are separated from the movable plate, wherein when the upper plate is coupled to the lower plate, the connection hooks are resiliently inserted and hooked between the inner end of the insertion aperture and the free end of the movable plate.

2. The bracket according to claim 1, wherein hooking protrusions are formed to protrude from the other surface of the lower plate opposite to the surface of the lower plate, on which the connection hooks are disposed.

3. The bracket according to claim 2, wherein the extension plate is bent towards a roof side panel, and an obtuse angle is formed between the lower plate and the extension plate.

4. The bracket according to claim 3, wherein a reinforcement protrusion are formed around each of the installation apertures, and disposed on the upper plate and the lower plate.

* * * * *